United States Patent
Zhang et al.

(10) Patent No.: US 11,509,368 B1
(45) Date of Patent: Nov. 22, 2022

(54) TECHNIQUES FOR LINE-OF-SIGHT MIMO COMMUNICATIONS USING RECTANGULAR ANTENNA ARRAYS

(71) Applicant: QUALCOMM Incorporated, San Diego, CA (US)

(72) Inventors: Danlu Zhang, Rancho Santa Fe, CA (US); Naga Bhushan, San Diego, CA (US); Abdelrahman Mohamed Ahmed Mohamed Ibrahim, San Diego, CA (US); Pinar Sen, San Diego, CA (US); Renqiu Wang, San Diego, CA (US); Tingfang Ji, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/482,219

(22) Filed: Sep. 22, 2021

(51) Int. Cl.
*H04L 23/02* (2006.01)
*H04B 7/0456* (2017.01)
*H04L 25/02* (2006.01)

(52) U.S. Cl.
CPC .......... *H04B 7/0478* (2013.01); *H04B 7/0473* (2013.01); *H04L 25/0204* (2013.01)

(58) Field of Classification Search
CPC .... H04B 7/0617; H04B 17/24; H04B 7/0452; H04B 7/0619; H04B 7/0695; H04B 7/0634; H04B 7/0413; H04B 7/0434; H04W 4/06; H04W 16/28; H04W 88/02; H04W 72/02
USPC .......................................... 375/262, 260, 267
See application file for complete search history.

(56) References Cited

U.S. PATENT DOCUMENTS

| | | | |
|---|---|---|---|
| 9,002,305 B1 * | 4/2015 | Nabar | H04W 72/085 455/526 |
| 2018/0048363 A1 * | 2/2018 | Okuyama | H04B 7/0456 |
| 2020/0287608 A1 * | 9/2020 | Trojer | H04W 88/085 |

* cited by examiner

*Primary Examiner* — Khai Tran
(74) *Attorney, Agent, or Firm* — Liem T. Do

(57) ABSTRACT

Methods, systems, and devices for wireless communications are described. A first wireless device may receive a request for beamforming information associated with line-of-sight (LoS) multiple input multiple output (MIMO) communication from a second wireless device. The first wireless device may generate a channel estimation matrix for a channel between rectangular antenna arrays of the respective wireless devices, the channel estimation matrix including one or more quadratic terms for the LoS MIMO communication. The first wireless device may generate a first sub-matrix and a second sub-matrix based on the channel estimation matrix. The first wireless device may transmit an indication of a set of precoders for the LoS MIMO communication, the set of precoders based on a symmetry associated with the first and second sub-matrices, and may receive the LoS MIMO communication from the second wireless device based on the set of precoders.

30 Claims, 10 Drawing Sheets

TECHNIQUES FOR LINE-OF-SIGHT MIMO COMMUNICATIONS USING RECTANGULAR ANTENNA ARRAYS

FIELD OF TECHNOLOGY

The following relates to wireless communications, including techniques for line-of-sight (LoS) multiple input multiple output (MIMO) communications using rectangular antenna arrays.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems support wireless communications at high frequencies (e.g., mmW or sub-THz). The short wavelengths at high frequencies enable the possibility of multiple-input-multiple-output (MIMO) channels in line-of-sight (LoS) situations. In order to determine precoders for LoS MIMO communications using rectangular antenna arrays, UEs may be required to solve complex, higher-order channel matrices associated with the rectangular antenna arrays, which may have many degrees of freedom that which require extensive processing capabilities which are unable to be performed by some lower-complexity UEs.

SUMMARY

The described techniques relate to improved methods, systems, devices, and apparatuses that support techniques for line-of-sight (LoS) multiple input multiple output (MIMO) communications using rectangular antenna arrays. Generally, aspects of the present disclosure support techniques for determining precoders for line-of-sight (LoS) multiple-input-multiple-output (MIMO) communications using rectangular antenna arrays. In particular, aspects of the present disclosure provide techniques for decomposing higher-order channel matrices into smaller sub-matrices which may be computationally easier for UEs to solve. For example, an Rx UE may receive a request for beamforming information from a Tx UE for LoS MIMO communications between the respective UEs. The Rx UE may determine a channel estimation matrix between the UEs, and may decompose the channel estimation matrix into x-dimension and y-dimension sub-matrices corresponding to the x and y dimensions of the channel estimation matrix. Decomposing the channel estimation matrix may enable the UE to generate smaller sub-matrixes which exhibit symmetry (e.g., symmetric Toeplitz matrices), effectively reducing the degrees of freedom of the sub-matrices and allowing for less computationally-expensive solving. As such, the Rx UE may be able to leverage the symmetric nature of the sub-matrices to simplify the determination of the precoders based on the sub-matrices, and may transmit the determined precoders back to the Tx UE for the LoS MIMO communications.

A method for wireless communication at a first wireless device is described. The method may include receiving, from a second wireless device, a request for beamforming information associated with LoS MIMO communication from the second wireless device to the first wireless device, generating a channel estimation matrix for a channel between a first rectangular antenna array of the first wireless device and a second rectangular antenna array of the second wireless device, the channel estimation matrix including one or more quadratic terms for the LoS MIMO communication, generating a first sub-matrix and a second sub-matrix based on the channel estimation matrix, transmitting, to the second wireless device, an indication of a set of multiple precoders for the LoS MIMO communication, the set of multiple precoders based on a symmetry associated with the first and second sub-matrices, and receiving the LoS MIMO communication from the second wireless device based on the set of multiple precoders.

An apparatus for wireless communication at a first wireless device is described. The apparatus may include a processor, memory coupled with the processor, and instructions stored in the memory. The instructions may be executable by the processor to cause the apparatus to receive, from a second wireless device, a request for beamforming information associated with LoS MIMO communication from the second wireless device to the first wireless device, generate a channel estimation matrix for a channel between a first rectangular antenna array of the first wireless device and a second rectangular antenna array of the second wireless device, the channel estimation matrix including one or more quadratic terms for the LoS MIMO communication, generate a first sub-matrix and a second sub-matrix based on the channel estimation matrix, transmit, to the second wireless device, an indication of a set of multiple precoders for the LoS MIMO communication, the set of multiple precoders based on a symmetry associated with the first and second sub-matrices, and receive the LoS MIMO communication from the second wireless device based on the set of multiple precoders.

Another apparatus for wireless communication at a first wireless device is described. The apparatus may include means for receiving, from a second wireless device, a request for beamforming information associated with LoS MIMO communication from the second wireless device to the first wireless device, means for generating a channel estimation matrix for a channel between a first rectangular antenna array of the first wireless device and a second rectangular antenna array of the second wireless device, the channel estimation matrix including one or more quadratic terms for the LoS MIMO communication, means for generating a first sub-matrix and a second sub-matrix based on the channel estimation matrix, means for transmitting, to the second wireless device, an indication of a set of multiple precoders for the LoS MIMO communication, the set of multiple precoders based on a symmetry associated with the first and second sub-matrices, and means for receiving the LoS MIMO communication from the second wireless device based on the set of multiple precoders.

A non-transitory computer-readable medium storing code for wireless communication at a first wireless device is described. The code may include instructions executable by a processor to receive, from a second wireless device, a request for beamforming information associated with LoS MIMO communication from the second wireless device to the first wireless device, generate a channel estimation matrix for a channel between a first rectangular antenna array of the first wireless device and a second rectangular antenna array of the second wireless device, the channel estimation matrix including one or more quadratic terms for the LoS MIMO communication, generate a first sub-matrix and a second sub-matrix based on the channel estimation matrix, transmit, to the second wireless device, an indication of a set of multiple precoders for the LoS MIMO communication, the set of multiple precoders based on a symmetry associated with the first and second sub-matrices, and receive the LoS MIMO communication from the second wireless device based on the set of multiple precoders.

Some examples of the method, apparatuses, and non-transitory computer-readable medium described herein may further include operations, features, means, or instructions for determining a first set of eigenvectors associated with the first sub-matrix and a second set of eigenvectors associated with the second sub-matrix based on the symmetry associated with the first and second sub-matrices, where the set of multiple precoders may be determined based on the first and second sets of eigenvectors.

In some examples of the method, apparatuses, and non-transitory computer-readable medium described herein, determining the first and second sets of eigenvectors may include operations, features, means, or instructions for determining the first and second sets of eigenvectors associated with the first and second sub-matrices, respectively, based on a first half of the first and second sets of eigenvectors including symmetric eigenvectors and a second half of the first and second sets of eigenvectors including anti-symmetric eigenvectors.

In some examples of the method, apparatuses, and non-transitory computer-readable medium described herein, the first set of eigenvectors may be symmetric with respect to the first sub-matrix and the second set of eigenvectors may be symmetric with respect to the second sub-matrix.

Some examples of the method, apparatuses, and non-transitory computer-readable medium described herein may further include operations, features, means, or instructions for generating the one or more quadradic terms of the channel estimation matrix based on performing a paraxial approximation of the channel estimation matrix.

In some examples of the method, apparatuses, and non-transitory computer-readable medium described herein, transmitting the indication of the set of multiple precoders may include operations, features, means, or instructions for transmitting an indication of N/2 or $$N + 1/2$$

precoders and an indication of a first subset of precoders which may be symmetric and a second set of precoders which may be anti-symmetric.

In some examples of the method, apparatuses, and non-transitory computer-readable medium described herein, transmitting an indication of the set of multiple precoders may include operations, features, means, or instructions for transmitting an indication of a pre-defined set of precoders selected from a set of multiple pre-defined sets of precoders.

Some examples of the method, apparatuses, and non-transitory computer-readable medium described herein may further include operations, features, means, or instructions for receiving, from a third wireless device, control signaling indicating the set of multiple pre-defined sets of precoders, where transmitting the indication of the pre-defined set of precoders may be based on receiving the control signaling.

In some examples of the method, apparatuses, and non-transitory computer-readable medium described herein, where a first order of the first sub-matrix may be based on a first quantity of antenna element rows associated with the first rectangular antenna array and a second quantity of antenna element rows associated with the second rectangular antenna array and where a second order of the second sub-matrix may be based on a first quantity of antenna element columns associated with the first rectangular antenna array and a second quantity of antenna element columns associated with the second rectangular antenna array.

In some examples of the method, apparatuses, and non-transitory computer-readable medium described herein, an order of the channel estimation matrix may be based on quantities of antenna element rows and quantities of antenna element columns of the first and second rectangular antenna arrays.

In some examples of the method, apparatuses, and non-transitory computer-readable medium described herein, the first sub-matrix includes a first symmetric Toeplitz matrix and and the second sub-matrix includes a second symmetric Toeplitz matrix.

In some examples of the method, apparatuses, and non-transitory computer-readable medium described herein, generating the first and second sub-matrices may include operations, features, means, or instructions for generating the first sub-matrix associated with a first dimension of the channel estimation matrix and generating the second sub-matrix associated with a second dimension of the channel estimation matrix, the second dimension orthogonal to the first dimension.

In some examples of the method, apparatuses, and non-transitory computer-readable medium described herein, a cross-product of the first sub-matrix and the second sub-matrix includes the channel estimation matrix.

DETAILED DESCRIPTION

Figure 1:
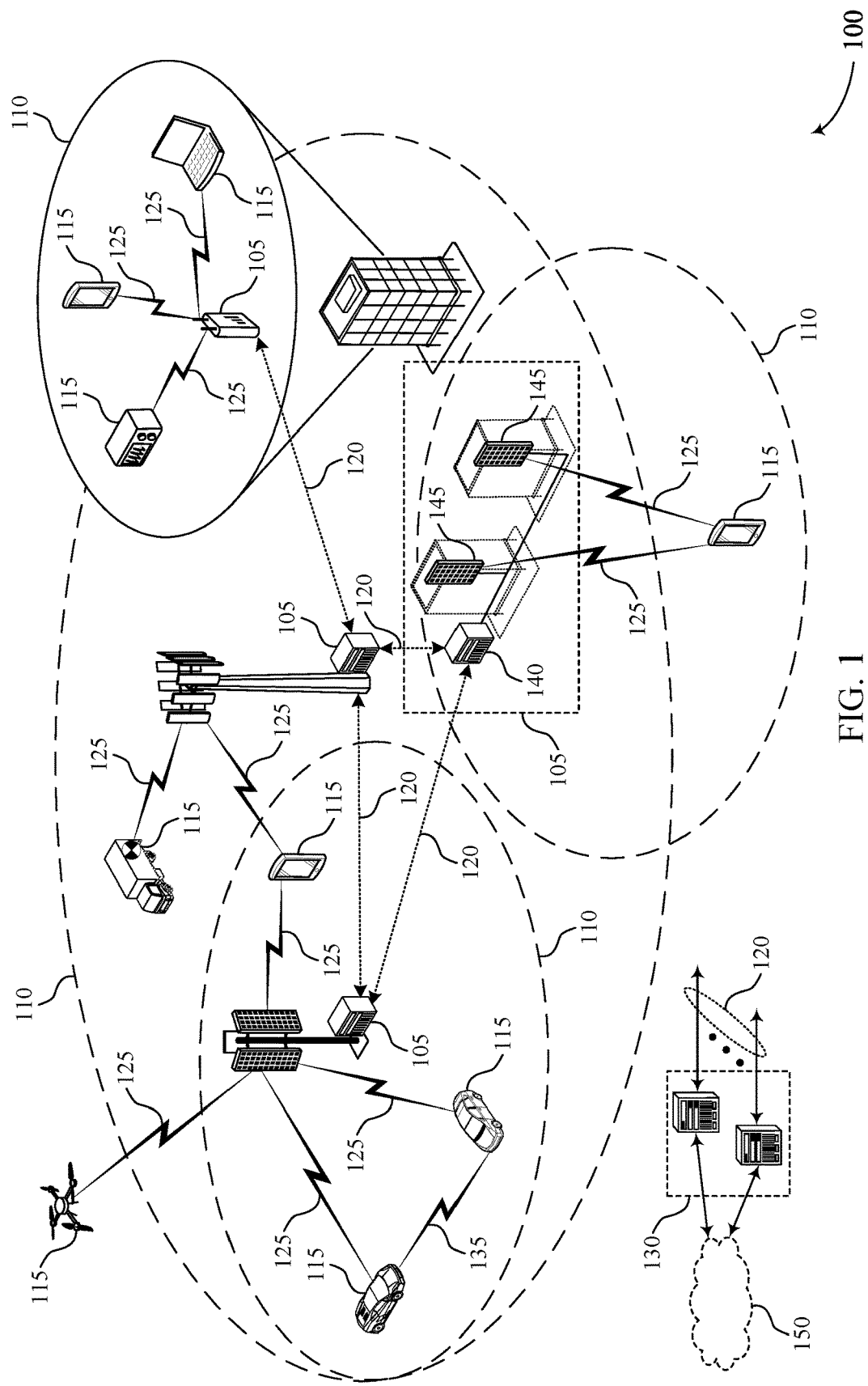
FIG. 1 illustrates an example of a wireless communications system that supports techniques for line-of-sight (LoS) multiple input multiple output (MIMO communications using rectangular antenna arrays in accordance with aspects of the present disclosure.

Some wireless communications systems support wireless communications at high frequencies (e.g., mmW or sub-THz). The short wavelengths at high frequencies enable the possibility of multiple-input-multiple-output (MIMO) channels in line-of-sight (LoS) situations. In other words, a Tx antenna array may transmit signals to an Rx antenna array along different directions (e.g., using different precoders). In order to determine precoders for LoS MIMO communications using rectangular antenna arrays, UEs may be required to solve complex, higher-order channel matrices associated with the rectangular antenna arrays. These higher-order channel matrices may have many degrees of freedom, which require extensive processing capabilities which are unable to be performed by some lower-complexity UEs. Moreover, determining precoders for LoS MIMO communications based on these higher-order channel matrices may be computationally expensive, which may increase power consumption and reduce battery life at the UE.

Accordingly, aspects of the present disclosure are directed to techniques for determining precoders for LoS MIMO communications using rectangular antenna arrays. In particular, some aspects of the present disclosure are directed to techniques for decomposing higher-order channel matrices into smaller sub-matrices which may be computationally easier for UEs to solve. For example, a receiving (Rx) UE may receive a request for beamforming information from a transmitting (Tx) UE for LoS MIMO communications between the respective UEs. The UE may determine a channel estimation matrix between the UEs, and may decompose the channel estimation matrix into x-dimension and y-dimension sub-matrices corresponding to the x and y dimensions of the channel estimation matrix. Decomposing the channel estimation matrix may enable the UE to generate smaller sub-matrixes which exhibit symmetry (e.g., symmetric Toeplitz matrices), effectively reducing the degrees of freedom of the sub-matrices and allowing for less computationally-expensive solving. As such, the Rx UE may be able to leverage the symmetric nature of the sub-matrices to simplify the determination of the precoders based on the sub-matrices, and may transmit the determined precoders back to the Tx UE for the LoS MIMO communications.

In some implementations, by decomposing a channel estimation matrix into symmetric sub-matrices, techniques described herein may enable UEs to reduce a quantity of eigenvectors, and therefore precoders, that the Rx UE must solve for the LoS MIMO communications. Specifically, the Rx UE may reduce an N dimensional problem to an N/2 dimensional problem, effectively reducing the quantity of eigenvectors that must be solved by half. Moreover, by simplifying the processing of symmetric sub-matrices, aspects of the present disclosure may enable UEs to retain quadradic terms within the channel estimation matrix while performing paraxial approximations, thereby improving the accuracy of precoder determination, which may lead to more efficient and reliable LoS MIMO communications.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for LoS MIMO communications using rectangular antenna arrays.

FIG. 1 illustrates an example of a wireless communications system 100 that supports techniques for LoS MIMO communications using rectangular antenna arrays in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support techniques which enable UEs 115 and other wireless devices (e.g., base stations 105, IAB nodes) to determine precoders for LoS MIMO communications using rectangular antenna arrays. In particular, some aspects of the present disclosure are directed to techniques for decomposing higher-order channel matrices into smaller sub-matrices which may be computationally easier for wireless devices to solve. For example, an Rx UE 115 of the wireless communications system 100 may receive a request for beamforming information from a Tx UE 115 for LoS MIMO communications between the respective UEs 115. In other words, the Tx UE 115 may request for the Rx UE 115 to determine precoders which will be used for the LoS MIMO communication between the respective UEs 115.

Continuing with the same example, the Rx UE 115 may determine a channel estimation matrix between the UEs 115, and may decompose the channel estimation matrix into x-dimension and y-dimension sub-matrices corresponding to the x and y dimensions of the channel estimation matrix. In some aspects, a size/order of the channel estimation matrix may be dependent on a relative size/order of rectangular antenna arrays at both the Tx and Rx UEs 115, respectively. Decomposing the channel estimation matrix may enable the Rx UE 115 to generate smaller sub-matrixes which exhibit symmetry (e.g., symmetric Toeplitz matrices), effectively reducing the degrees of freedom of the sub-matrices and allowing for less computationally-expensive solving. As such, the Rx UE 115 may be able to leverage the symmetric nature of the sub-matrices to simplify the determination of the precoders based on the sub-matrices, and may transmit the determined precoders back to the Tx UE 115 for the LoS MIMO communications. The Tx UE 115 may then transmit the LoS MIMO communication to the Rx UE 115 using the indicated precoders.

In some implementations, by decomposing a channel estimation matrix into symmetric sub-matrices, techniques described herein may enable the Rx UE 115 to reduce a quantity of eigenvectors, and therefore precoders, that the Rx UE 115 must solve for the LoS MIMO communications. Specifically, the Rx UE 115 may reduce an N dimensional problem to an N/2 dimensional problem, effectively reducing the quantity of eigenvectors that must be solved by half. Moreover, by simplifying the processing of symmetric sub-matrices, aspects of the present disclosure may enable UEs 115 to retain quadradic terms within the channel estimation matrix while performing paraxial approximations, thereby improving the accuracy of precoder determination, which may lead to more efficient and reliable LoS MIMO communications.

Techniques of the present disclosure may simplify the determination of precoders which will be used for performance of LoS MIMO communications in the context of rectangular arrays. In particular, techniques described herein may enable UEs 115 to decompose channel estimation matrices which are based on rectangular antenna arrays into smaller, symmetric sub-arrays, effectively reducing the degrees of freedom of the sub-matrices and allowing for less computationally-expensive solving. As such, techniques described herein may reduce a computational complexity of LoS MIMO communications, thereby reducing power consumption at the UEs 115, and improving battery life. Moreover, reducing the computational complexity of LoS MIMO communications may enable lower-complexity UEs to perform such communications, which may lead to more widespread use of LoS MIMO communications.

Figure 2:
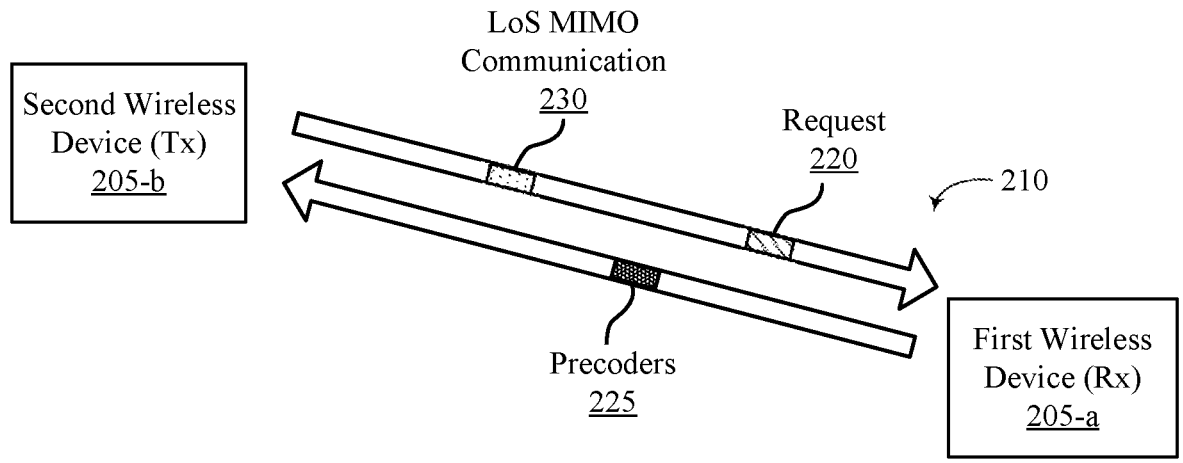
FIG. 2 illustrates an example of a wireless communications system that supports techniques for LoS MIMO communications using rectangular antenna arrays in accordance with aspects of the present disclosure.
Figure 2:
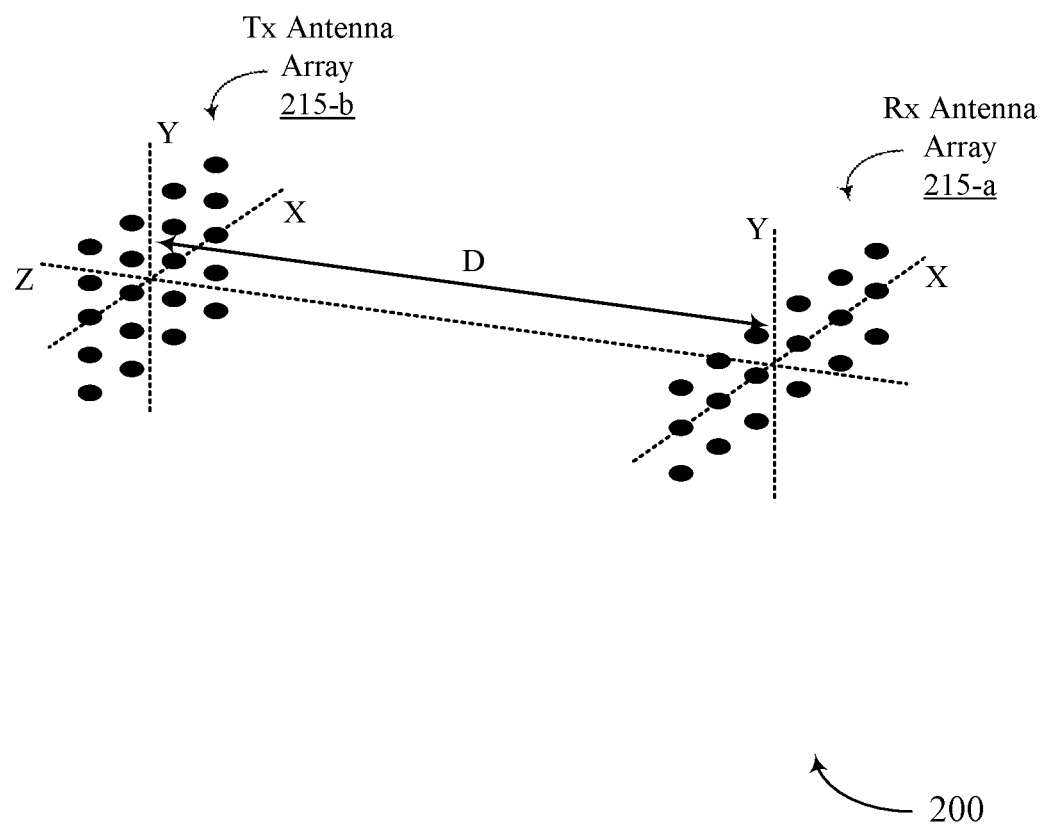

FIG. 2 illustrates an example of a wireless communications system 200 that supports techniques for LoS MIMO communications using rectangular antenna arrays in accordance with aspects of the present disclosure. In some examples, wireless communications system 200 may implement, or be implemented by, aspects of wireless communications system 100. For example, wireless communications system 200 may support techniques for improved LoS MIMO communications in the context of rectangular antenna arrays, as described in FIG. 1.

The wireless communications system 200 may include a first wireless device 205-a and a second wireless device 205-b, which may be examples base stations 105, UEs 115, and other wireless devices (e.g., IAB nodes) as described with reference to FIG. 1. For example, in some cases, the first wireless device 205-a may be an example of a first UE 115, and the second wireless device 205-b may be an example of a second UE 115. In such cases, the first and second wireless devices 205-a, 205-b may communicate with one another via a communication link 210, which may be an example of a sidelink or PC5 link.

In other cases, the first wireless device 205-a may be an example of a UE 115, and the second wireless device 205-b may be an example of a base station 105. In such cases, the first and second wireless devices 205 may communicate with one another via the communication link 210, which may be an example of an NR or LTE link between the first wireless device 205-a (e.g., UE 115) and the second wireless device 205-b (e.g., base station 105). In some cases, the communication link 210 between the wireless devices 205 may include an example of an access link (e.g., Uu link) which may include a bi-directional link that enables both uplink and downlink communication.

The wireless communications system 200 may support wireless communications at high frequencies (e.g., mmW or sub-THz). The short wavelengths at high frequencies enable the possibility of MIMO channels in LoS situations. In other words, a Tx antenna array (e.g., Tx antenna array 215-b) may transmit signals to an Rx antenna array (e.g., Rx antenna array 215-a) along different directions (e.g., using different precoders). Some wireless communications systems 200 may support LoS MIMO communications 230 in accordance with two antenna arrangement configurations: orbital angular momentum (OAM) configurations, and rectangular configurations. In the context of OAM configurations, Tx and Rx antennas are arranged in multiple concentric circles. In other words, in the context of OAM configurations, the Tx antenna array 215-a and the Rx antenna array 215-b of the respective wireless devices 205 may include multiple concentric circles of antenna elements. is one technique for enabling LoS MIMO communications 230.

Comparatively, in the context of rectangular configurations, antenna elements may be arranged into rectangular antenna arrays. For example, as shown in FIG. 2, the first wireless device 205-a may include a first rectangular antenna array 215-a, and the second wireless device 205-b may include a second rectangular antenna array 215-b. The respective rectangular antenna arrays 215 may include sets of antenna elements which are arranged into rows and columns. Rectangular antenna arrays 215 may enable better utilization of antenna panel space, as most antenna panels are rectangular in shape. Moreover, rectangular antenna arrays 215 may enable total separability of the two dimensions (e.g., x-dimension, y-dimension) in channel matrix processing and feedback, as will be discussed in further detail herein.

In order to determine precoders for LoS MIMO communications 230 using rectangular antenna arrays 215, wireless devices 205 (e.g., UEs 115, base stations 105) may be required to solve complex, higher-order channel matrices associated with the rectangular antenna arrays 215. These higher-order channel matrices may have many degrees of freedom, which require extensive processing capabilities which are unable to be performed by some lower-complexity wireless devices (e.g., reduced-capability UEs 115). Moreover, determining precoders for LoS MIMO communications based on these higher-order channel matrices may be computationally expensive, which may increase power consumption and reduce battery life at the wireless devices 205.

Accordingly, aspects of the present disclosure are directed to techniques for determining precoders for LoS MIMO communications 230 using rectangular antenna arrays. Aspects of the present disclosure may exploit the structure of MIMO precoders for LoS MIMO communications 230 in order to reduce a computational complexity for determining precoders, and reduce a complexity for precoder feedback.

In some aspects, the first wireless device 205-a may receive a request 220 for beamforming information associated with LoS MIMO communications 230 from the second wireless device 205-b to the first wireless device 205-a. In other words, the second wireless device 205-b may transmit the request 220 for the first wireless device 205-a to perform channel estimation techniques and determine precoders 225 which will be used by the second wireless device 205-b to transmit LoS MIMO communications 230 to the first wireless device 205-a.

Principles of Fresnel diffraction may provide the justification of LoS MIMO in physics in cases where paraxial approximation (as opposed to far-field approximation) is appropriate. In particular, some aspects of the present disclosure are directed to techniques for decomposing higher-order channel matrices into smaller sub-matrices which may be computationally easier for UEs to solve.

As shown in FIG. 2, the antenna arrays 215-a, 215-b may include two-dimensional (e.g., x-dimension, y-dimension), co-polarized antenna arrays which face one another (Tx and Rx). The Tx antenna array 215-b may include $N_x \times N_y$ transmit antenna elements, whereas the Rx antenna array 215-a may include $M_x \times M_y$ receive antennas. The respective antenna arrays 215-a, 215-b may be parallel to one another in some cases, but need not be parallel. In some cases, and for the purposes of illustration, the centers of the respective antenna arrays 215-a, 215-b may be aligned and separated by a distance D, as shown in FIG. 2. For cases in which D>>aperture (e.g., for intermediate to far-field implementations), techniques described herein may utilize optimal precoders for the Tx side (e.g., second wireless device 205-b) and may exploit the structures in the MIMO modes between the respective antenna arrays 215 to reduce a complexity of operations for determining precoders.

Based on the theory of Green function (e.g., waveform from a single point source with the same boundary condition), the Helmholtz equation $\nabla^2 v + k^2 v = 0$ may be solved in an integral form, which is the equivalent to the Huygens-Fresnel principle. The signal at the receiver plane v (e.g., at the Rx antenna array 215-a) may be written as a function of a transmitter signal u, as illustrated in Equation 1 below:

$$v = \int u \frac{\exp(jkr)}{r} \psi dS \tag{1}$$

where $\psi = \cos \theta$ (or some other function of the angle of propagation close to $\cos \theta$).

In some cases, $\psi$ may be approximated to be close to 1 (e.g., $\psi \approx 1$). This integral form of Equation 1 may be easy for simulation, but it does not correspond to solution form, especially when the transceivers (e.g., antenna elements of the respective antenna arrays 215) are discrete units. Moreover, Eigen modes of Equation 1 must be found by singular value decomposition (SVD) of the transfer matrix, which may require a conjecture that Gaussian term(s) is present in the eigen vectors.

Maxwell equations as vector equations, in free space without any free charge, may be solved by a scalar form including the Helmholtz equation above. Assuming a paraxial wave v=ue$^{ikz}$ and assuming the variation of amplitude u in the z direction is slow, and dropping the term $$\frac{\partial^2}{\partial z^2} u,$$

the Helmholtz equation becomes Equation 2 below:

$$i\frac{\partial}{\partial z} u = -\frac{1}{2k}\left(\frac{\partial^2}{\partial x^2} + \frac{\partial^2}{\partial y^2}\right) u \quad (2)$$

which may be solved according to a differential solution, or an integral solution, such as the Green function and the Huygens-Fresnel Principle.

In order to derive the transfer matrix H (e.g., channel estimation matrix) between the first antenna array 215-a and the second antenna array 215-b, it may be illustrative to start from the assumption of OAM antenna configurations with antenna elements arranged in concentric circles with coordinates $(r_n, \theta_n)$ and $(r_m, \theta_m)$. Performing discreet angular sampling in the context of OAM antenna configurations, and assuming N Tx antenna elements and N Rx antenna elements, the transfer matrix H between the antenna arrays 215, and ignoring the cosine factor in the amplitude in Huygens-Fresnel formula, may be found according to Equation 3:

$$H_{m,n} \propto \frac{\exp\left(jk\sqrt{z^2 + (r_1\cos\theta_1 - r_2\cos\theta_2)^2 + (r_1\sin\theta_1 - r_2\sin\theta_2)^2}\right)}{\sqrt{z^2 + (r_1\cos\theta_1 - r_2\cos\theta_2)^2 + (r_1\sin\theta_1 - r_2\sin\theta_2)^2}} \quad (3)$$

which may be simplified to yield Equation 4:

$$H_{m,n} \propto \frac{\exp\left\{jk\sqrt{z^2 + r_1^2 + r_2^2 - 2r_1 r_2 \cos(\theta_1 - \theta_2)}\right\}}{\sqrt{z^2 + r_1^2 + r_2^2 - 2r_1 r_2 \cos(\theta_1 - \theta_2)}} \quad (4)$$

Referring to the rectangular antenna arrays 215-a, 215-b of the wireless communications system 200, the channel (channel estimation matrix H) between the Tx antenna elements of the second antenna array 215-b $(x_i, y_j)$ and the Rx antenna elements of the first antenna array 215-a $(x_p, y_q)$ may be defined by converting the polar coordinates of Equation 4 above into rectangular coordinates, which yields Equation 5 below:

$$H_{x_i y_j, x_p y_q} \sim \frac{\exp\left(-i2\pi \frac{d x_i y_j, x_p y_q}{\lambda}\right)}{d x_i y_j, x_p y_q} \quad (5)$$

In some aspects, the first wireless device 205-a may determine the channel estimation matrix $H_{x_i y_j, x_p y_q}$ for the channel between the respective antenna arrays 215 in response to receiving the request 220.

Referring to the channel estimation matrix of Equation 5 above for rectangular antenna arrays, the x-dimension and the y-dimension may be totally separated, reducing the $(N_x \times N_y) \times (M_x \times M_y)$ matrix to two smaller sub-matrices: (1) $N_x \times M_x$ (x-dimension), and (2) $N_y \times M_y$ (y-dimension). According to some techniques of the present disclosure, by decomposing higher-order channel matrices (e.g., H) into smaller sub-matrices (e.g., x- and y-dimension sub-matrices), eigenvectors (beamforming pre-coders) and eigenvalues (mode strength) may be calculated and fed back to Tx devices (e.g., second wireless device 205-b) separately. Each respective eigenvector may correspond to a respective eigenvalue. Moreover, the channel matrix for each of the respective the sub-matrices for each dimension/axis may include symmetric Toeplitz matrices. As will be discussed in further detail herein, symmetric Toeplitz matrices may imply an important property of precoders for LoS MIMO communications in that roughly half of the precoders for each respective sub-matrix are symmetric, and the other half anti-symmetric. As such, the symmetric nature of the sub-matrices may effectively the degrees of freedom of the sub-matrices by reducing the effective size of the channel estimation matrix to a quarter of the overall channel estimation matrix: half of quantity of rows of the rectangular antenna arrays 215-a, 215-b and half of the quantity of columns of the rectangular antenna arrays 215-a, 215-b.

Performing further paraxial approximation of Equation 5 above yields Equation 6:

$$H_{x_i y_j, x_p y_q} \sim \frac{\exp\left(-i2\pi \frac{d x_i y_j, x_p y_q}{\lambda}\right)}{d x_i y_j, x_p y_q} \approx \frac{\exp\left(-i2\pi \frac{d x_i y_j, x_p y_q}{\lambda}\right)}{z} \quad (6)$$

which may be further simplified to Equation 7 through Equation 10 below:

$$H_{x_i y_j, x_p y_q} = \frac{\exp\left[\frac{-i2\pi}{\lambda}\sqrt{z^2 + (x_i - x_p)^2 + (y_j - y_q)^2}\right]}{z} \quad (7)$$

$$\approx \frac{\exp\left[\frac{-i2\pi}{\lambda}\left(z + \frac{(x_i - x_p)^2}{2z} + \frac{(y_j - y_q)^2}{2z}\right)\right]}{z} \quad (8)$$

$$= \frac{\exp\left(\frac{-i2\pi z}{\lambda}\right)}{z} \exp\left[\frac{-i2\pi(x_i - x_p)^2}{\lambda z}\right] \exp\left[\frac{-i2\pi(y_j - y_q)^2}{\lambda z}\right] \quad (9)$$

$$\sim \exp\left[\frac{-i2\pi(x_i - x_p)^2}{\lambda z}\right] \exp\left[\frac{-i2\pi(y_j - y_q)^2}{\lambda z}\right] \quad (10)$$

The channel estimation matrix $H_{x_i y_j, x_p y_q}$ for the channel between the first antenna array 215-a and the second antenna array 215-b (as illustrated by Equations 6-10 above) is a tensor notation. Further, the x-dimension and the y-dimension of the channel estimation matrix $H_{x_i y_j, x_p y_q}$ are totally separable, as shown in Equation 11 below:

$$H_{x_i y_j, x_p y_q} = H_{x(i,p)} \otimes H_{y(j,q)} \quad (11)$$

In some aspects, the first wireless device 205-a may determine the first sub-matrix $H_{x(i,p)}$ and the second sub-matrix $H_{y(j,q)}$ based on the channel estimation matrix $H_{x_i y_j, x_p y_q}$ in accordance with Equations 5-11 above.

The matrices $H_{x(i,p)}$ and $H_{y(j,q)}$ of Equation 11 above are sub-matrices of the channel estimation matrix $H_{x_i y_j, x_p y_q}$ associated with the x-dimension and y-dimension, respectively.

The eigenvalues and eigenvectors of the matrix $H_{x_i y_j, x_p y_q}$ (e.g., $H_{xy}$) are a product (cross-product) of the eigenvalues and eigenvectors of the sub-matrices $H_{x(i,p)}$ and $H_{y(j,q)}$, which may be defined by Equation 11 and Equation 13 below:

$$H_{x(i,p)} \sim \exp\left[\frac{-i2\pi(x_i - x_p)^2}{\lambda z}\right] \quad (12)$$

$$H_{y(j,q)} \sim \exp\left[\frac{-i2\pi(y_j - y_q)^2}{\lambda z}\right] \quad (13)$$

To separate the eigen structures of Equation 13 above into the separate x- and y-directions, let $H_x v_x = \mu_x v_x$, $H_y v_y = \mu_y v_y$, and $v_{xy} = v_x \otimes v_y$, which yields Equation 14 through Equation 17 below:

$$H_{xy} v_{xy} = \Sigma x_i \Sigma y_j \Sigma x_p \Sigma y_q H_{x_p y_j, x_p y_q} v_{x_p y_i, x_p y_q} = \quad (14)$$

$$\Sigma_{x_i} \Sigma_{y_j} \Sigma_{x_p} \Sigma_{y_q} H_{x(i,p)} H_{y(j,p)} v_{x(i,p)} v_{y(j,p)} = \quad (15)$$

$$\Sigma_{x_i} \Sigma_{x_p} H_{x(i,p)} v_{x(i,p)} \Sigma_{y_j} \Sigma_{y_q} H_{y(j,q)} v_{y(j,q)} = \quad (16)$$

$$\mu_x \mu_y v_x \otimes v_y \quad (17)$$

The Equations above assume perfect alignment between the first antenna array 215-a and the second antenna array 215-b. In other words, they assume that the centers of the respective antenna arrays 215 are aligned along the z-axis, and that the respective x-axes and y-axes of the antenna arrays are parallel and perpendicular to the z-axis. However, these conditions are not always met in practice. For example, in some cases, the Tx and Rx antenna arrays 215 may be parallel to one another and perpendicular to the z-axis, but the centers of the respective antenna arrays 215 may not be aligned. That is, the center of the Rx antenna array 215-a may be positioned at $(X_0, Y_0)$, which is offset relative to the Tx antenna array 215-b and/or the z-axis illustrated in FIG. 2. This may be due to imperfect alignment, or an intentional design choice to allow for different heights and/or positions between the respective antenna arrays 215. In such cases, the separation of the channel estimation matrix from Equation 11 above (e.g., $H_{x_i y_j, x_p y_q} = H_{x(i,p)} \otimes H_{y(j,q)}$) is still valid. Moreover, the sub-matrices for the x- and y-dimensions ($H_{x(i,p)}$, $H_{y(j,q)}$) from Equations 12 and 13 are still symmetric Toeplitz matrices. However, the expression for the matrix elements may be more complicated, that is, in cases where the centers of the antenna arrays 215 are not aligned, the equations above may still be valid, but more computationally intensive to solve.

The respective sub-matrices $H_{x(i,p)}$ and $H_{y(j,q)}$ for the x-dimension and the y-dimension may be further illustrated as symmetric Toeplitz matrices. For example, assuming $N_x$ of the Tx antenna array 215-b is equal to $M_x$ of the Rx antenna array 215-a (e.g., $N_x = M_x = N$), and assuming that $$H_{x(i,p)} \sim \exp\left[\frac{-i2\pi(x_i - x_p)^2}{\lambda z}\right]$$

is a symmetric Toeplitz matrix, the Tx and Rx elements may be positioned on a regular grid, namely, $x_i = id_x$. Let $\rho = \exp\left[\frac{-i2\pi d_x^2}{\lambda z}\right]$, and the sub-matrix $H_x$ of the channel estimation matrix $H_{xy}$ may be represented according to Equation 18 below:

$$H_x = \begin{pmatrix} 1 & \rho & \rho^4 & \rho^9 & \ldots & \rho^{(N-1)^2} \\ \rho & 1 & \rho & \rho^4 & \ldots & \rho^{(N-2)^2} \\ \rho^4 & \rho & 1 & \rho & \ldots & \rho^{(N-3)^2} \\ \rho^9 & \rho^4 & \rho & 1 & \ldots & \rho^{(N-4)^2} \\ \vdots & \vdots & \vdots & \vdots & \ddots & \vdots \\ \rho^{(N-1)^2} & \rho^{(N-2)^2} & \rho^{(N-3)^2} & \rho^{(N-4)^2} & \ldots & 1 \end{pmatrix} \quad (18)$$

As may be seen in Equation 18 above, the sub-matrices $H_x$, $H_y$ of the channel estimation matrix $H_{xy}$ may include symmetric Toeplitx matrices. This may greatly simplify the computational complexity for solving the eigenvectors/precoders of the sub-matrices, where each respective eigenvector/precoder corresponds to a respective eigenvalue. In particular, if $H_x$ has N distinct eigenvectors (among the N eigenvectors), $$\left\lfloor \frac{N+1}{2} \right\rfloor$$

eigenvectors/precoders are symmetric with respect to the to the center of the sub-matrix and/or rectangular antenna array 215, where the other $\lfloor N/2 \rfloor$ eigenvectors/precoders are anti-symmetric with respect to the center. The Gaussian-Hermite solution satisfies this property. In effect, by decomposing the channel estimation matrix $H_{xy}$ between the rectangular antenna arrays 215-a, 215-b into symmetric sub-matrices $H_x$, $H_y$, an N dimensional problem can be solved (e.g., by the first wireless device 205-a) as an N/2 dimensional problem, effectively reducing the computational complexity (and processing resources) required to solve for the respective precoders for LoS MIMO communications. In other words, the symmetric Toeplitz properties of the sub-matrices may enable the first wireless device 205-a to solve the eigenvectors/precoders of the sub-matrices in a less computationally intensive manner, which may reduce a complexity at the first wireless device 205-a and reduce processing power and resources required to solve for the precoders/eigenvectors.

For example, assuming alignment between the Rx antenna array 215-a and the Tx antenna array 215-a, and assuming N=2, it may be found that $\mu = 1 \pm \rho$ and $v = (1, \pm 1)^T$. Similarly, assuming alignment between the Rx antenna array 215-a and the Tx antenna array 215-a, and assuming N=3, it may be found that $\mu_1 = 1 - \rho$ and $v_1 = (1, 0, -1)^T$ and $$\mu_{2,3} = 1 + \frac{\rho^4}{2} \pm \sqrt{\frac{\rho^8}{4} + 2\rho^2}$$

and $v_{2,3} = (1, \pm\sqrt{1+8\rho^{-6}} - 1, 1)^T$. Further, assuming alignment between the Rx antenna array 215-a and the Tx antenna array 215-a, and assuming N=4, solving the two-dimensional problem for μ and x (with four solutions) yields Equation 19:

$$\begin{bmatrix} 1-\mu & \rho & \rho^4 & \rho^9 \\ \rho & 1-\mu & \rho & \rho^4 \\ \rho^4 & \rho & 1-\mu & \rho \\ \rho^9 & \rho^4 & \rho & 1-\mu \end{bmatrix} \begin{bmatrix} 1 \\ x \\ \pm x \\ \pm 1 \end{bmatrix} = 0 \quad (19)$$

Continuing with reference to Equation 19 for the case in which N=4, only the first two equations are independent, as shown in Equation 20 and Equation 21 below:

$$(1-\mu)+\rho x \pm \rho^4 x \pm \rho^9 = 0 \qquad (20)$$

$$\rho+(1-\mu)x \pm \rho x \pm \rho^4 = 0 \qquad (21)$$

Solving for µ and x yields equations Equation 22 through Equation 25 below:

$$\mu_{1,2} = 1 - \frac{1}{2}\left\{-\rho(1+\rho^8) \pm \sqrt{\rho^2(1+\rho^8)^2 - 4[\rho^{10} - \rho^2(1+\rho^3)^2]}\right\} \qquad (22)$$

$$x_{1,2} = -\frac{(1-\mu)+\rho^9}{\rho(1+\rho^3)} \qquad (23)$$

$$\mu_{3,4} = 1 - \frac{1}{2}\left\{\rho(1+\rho^8) \pm \sqrt{\rho^2(1+\rho^8)^2 - 4[\rho^{10} - \rho^2(1-\rho^3)^2]}\right\} \qquad (24)$$

$$x_{3,4} = -\frac{(1-\mu)-\rho^9}{\rho(1-\rho^3)} \qquad (25)$$

Additionally, or alternatively, pi and x may be defined according to Equation 26 and Equation 27 below:

$$\mu = 1 - \frac{1}{2}\left\{\mp\rho(1+\rho^8) \pm \sqrt{\rho^2(1+\rho^8)^2 - 4[\rho^{10} - \rho^2(1 \pm \rho^3)^2]}\right\} \qquad (26)$$

$$x = -\frac{(1-\mu) \pm \rho^9}{\rho(1 \pm \rho^3)} \qquad (27)$$

Continuing with the derivation to solve for µ may result in Equation 28:

$$\mu = 1 + 1/2\{\pm\rho(1+\rho^8) \pm \sqrt{\rho^2(1+\rho^8)^2 - 4[\rho^{10} - \rho^2(1\pm\rho^3)^2]}\} \qquad (28)$$

where the "±" operator between the ±ρ(1+ρ⁸) term and the quadradic and square root term is independent from the other "±" operators. Specifically, the "±" operator between the +ρ(1+ρ⁸) term and the quadradic and square root term is from the two roots of a quadratic equation, whereas the other "±" operators within Equation 28 are from the symmetry and anti-symmetry of the eigenvectors/precoders of the sub-matrices.

Upon determining the precoders/eigenvectors for the LoS MIMO communication 230 based on the sub-matrices, the first wireless device 205-a may transmit, to the second wireless device 205-b, an indication of a set of precoders 225 which are to be used for the LoS MIMO communication 230. In other words, the first wireless device 205-a may transmit an indication of the eigenvectors/precoders 225 which were determined based on the symmetric Toeplitz sub-matrices. Subsequently, the second wireless device 205-b may transmit the LoS MIMO communication 230 using the rectangular antenna array 215-b and the indicated set of precoders 225.

Techniques of the present disclosure may simplify the determination of precoders which will be used for performance of LoS MIMO communications 230 in the context of rectangular antenna arrays 215. In particular, techniques described herein may enable the first wireless device 205-a to decompose channel estimation matrices which are based on rectangular antenna arrays 215 into smaller, symmetric sub-arrays, effectively reducing the degrees of freedom of the sub-matrices and allowing for less computationally-expensive solving. As such, techniques described herein may reduce a computational complexity of LoS MIMO communications 230, thereby reducing power consumption at the first wireless device 205-a, and improving battery life. Moreover, reducing the computational complexity of LoS MIMO communications 230 may enable lower-complexity wireless devices 205 to perform such communications, which may lead to more widespread use of LoS MIMO communications 230.

Figure 3:
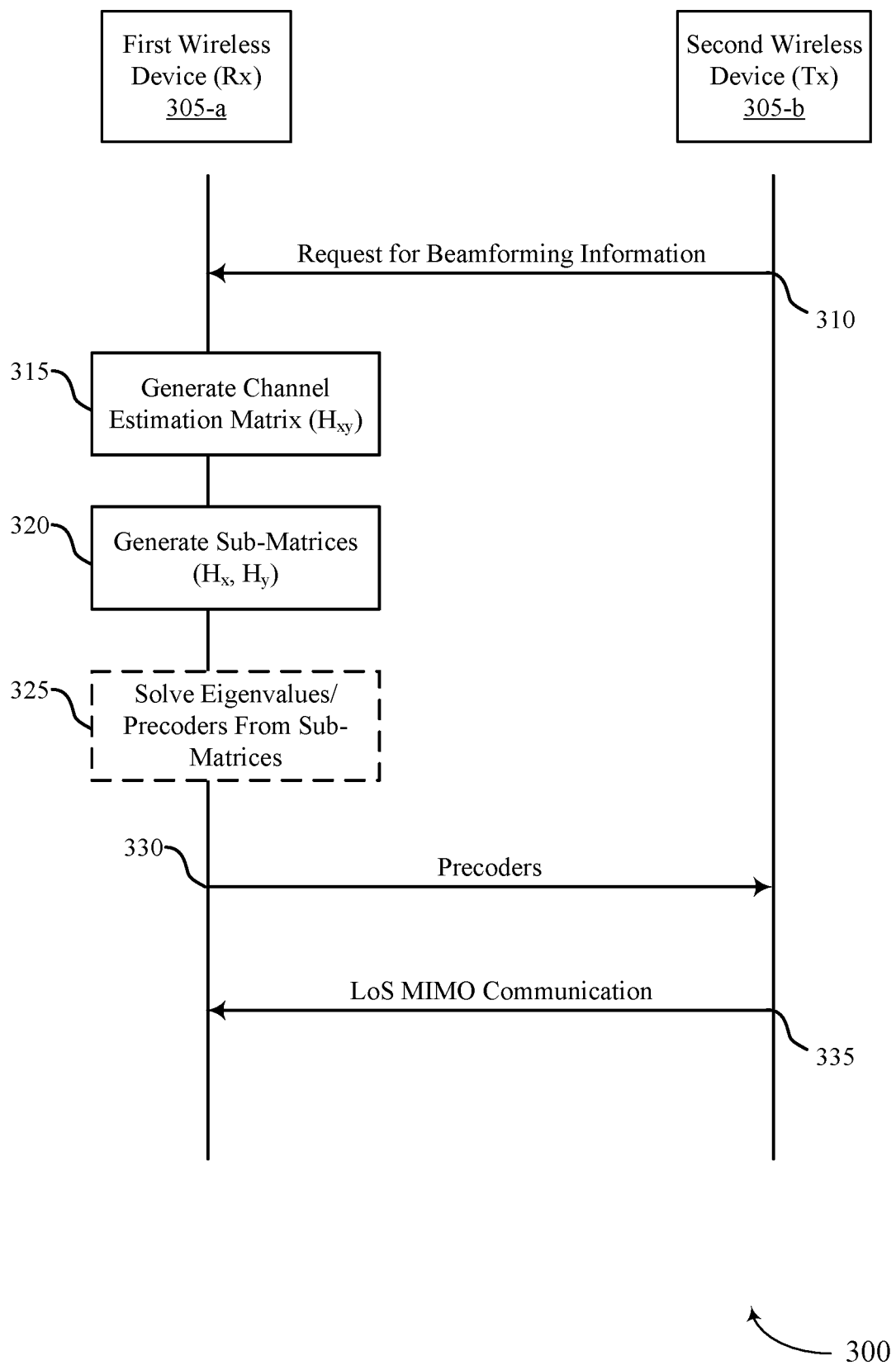
FIG. 3 illustrates an example of a process flow that supports techniques for LoS MIMO communications using rectangular antenna arrays in accordance with aspects of the present disclosure.

FIG. 3 illustrates an example of a process flow 300 that supports techniques for LoS MIMO communications using rectangular antenna arrays in accordance with aspects of the present disclosure. In some examples, process flow 300 may implement, or be implemented by, aspects of wireless communications system 100, wireless communications system 200, or both. For example, the process flow 300 may illustrate a first wireless device 305-a receiving a request for beamforming information associated with LoS MIMO communications from a second wireless device 305-b, decomposing a channel estimation matrix into symmetric sub-matrices, determining precoders for the LoS MIMO communication based on the symmetric sub-matrices, and reporting the determined precoders back to the second wireless device 305-b, as described with reference to FIGS. 1-2.

In some cases, process flow 300 may include a first wireless device 305-a and a second wireless device 305-b, which may be examples of corresponding devices as described herein. In particular, the first wireless device 305-a and a second wireless device 305-b illustrated in FIG. 4 may include examples of the first wireless device 205-a and a second wireless device 205-b illustrated in FIG. 2. In some examples, the first wireless device 305-a may include a first UE 115, and second wireless device 305-b may include a second UE 115.

In some examples, the operations illustrated in process flow 300 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 310, the first wireless device 305-a (e.g., Rx device) may receive, from the second wireless device 305-b (e.g., Tx device), a request for beamforming information associated with LoS MIMO communications from the second wireless device 305-b to the first wireless device 305-a. In other words, the second wireless device 305-b may request for the first wireless device 305-a to perform channel estimation techniques and determine precoders which will be used by the second wireless device 305-b to transmit LoS MIMO communications to the first wireless device 305-a. In some aspects, each of the wireless devices 305-a, 305-b may include rectangular antenna arrays, as shown in FIG. 2.

At 315, the first wireless device 305-a may generate a channel estimation matrix ($H_{xy}$) for a channel between the first wireless device 305-a and the second wireless device 305-b. In particular, the first wireless device 305-a may generate a channel estimation matrix for a channel between a first rectangular antenna array of the first wireless device 305-a and a second rectangular antenna array of the second wireless device 305-b. The first wireless device 305-a may generate the channel estimation matrix based on receiving the request for beamforming information at 310.

In some aspects, the channel estimation matrix may include one or more quadratic terms for the LoS MIMO communications. For example, in some implementations, the first wireless device 305-a may determine/generate the channel estimation matrix ($H_{xy}$) based on, or in accordance with, Equations 5-10 above. In this regard, the first wireless device 305-a may generate the channel estimation matrix (including quadradic terms) by performing paraxial approximation, as illustrated in Equations 5-10 above.

The order of the channel estimation matrix (i.e., the quantities of rows and columns of the channel estimation matrix) may be based on the quantities of antenna element rows and quantities of antenna element columns within the first and second rectangular arrays of the first wireless device 305-a and the second wireless device 305-b, respectively. For example, in cases where the first wireless device 305-a includes four rows and five columns of antenna elements (e.g., 4×5 rectangular antenna array), and the second wireless device 305-b includes four rows and five columns of antenna elements (e.g., 4×5 rectangular antenna array), the channel estimation matrix may include a 20×20 matrix (e.g., Tx: 4*5=20; Rx: 4*5=20).

At 320, the first wireless device 305-a may generate a first sub-matrix and a second sub-matrix based on the channel estimation matrix which was generated at 315. In other words, the first wireless device 305-a may decompose the channel estimation matrix ($H_{xy}$) into a first sub-matrix ($H_x$) and a second sub-matrix ($H_y$). In particular, the first sub-matrix ($H_x$) may be associated with a first dimension (x-dimension) of the channel estimation matrix, and the second sub-matrix ($H_y$) may be associated with a second dimension (y-dimension) of the channel estimation matrix (or vice versa). In such cases, the respective dimensions of the sub-matrices may be orthogonal to one another (e.g., x-dimension is orthogonal to the y-dimension). For example, the first wireless device 305-a may generate sub-matrices $H_{x(i,p)}$ and $H_{y(j,q)}$ in accordance with Equations 11-13 above. Moreover, in some cases, a cross-product of the first sub-matrix and the second sub-matrix may equal the channel estimation matrix (e.g., $H_{x_iy_ix_py_q} = H_{x(i,p)} \otimes H_{y(j,q)}$).

In some aspects, the sub-matrices generated by the first wireless device 305-a may exhibit symmetric properties which may simplify the computational complexity associated with solving for eigenvectors/precoders of the respective sub-matrices. For example, in some implementations, the first and second sub-matrices ($H_{x(i,p)}$ and $H_{y(j,q)}$) may each include symmetric Toeplitz matrices, as shown in Equation 18 above.

The respective orders of the sub-matrices (e.g., quantities of rows and columns) may be based on the quantities of rows and columns within the first rectangular antenna array of the first wireless device 305-a and the second antenna array of the second wireless device 305-b. In particular, a first order of the first sub-matrix ($H_{x(i,p)}$) may be based on a first quantity of antenna element rows associated with the first rectangular antenna array and a second quantity of antenna element rows associated with the second rectangular antenna array, whereas a second order of the second sub-matrix ($H_{y(j,q)}$) may be based on a first quantity of antenna element columns associated with the first rectangular antenna array and a second quantity of antenna element columns associated with the second rectangular antenna array. For instance, in cases where both the first and second rectangular arrays include 4×5 rectangular antenna arrays, the first sub-matrix $H_{x(i,p)}$ may include a 4×4 matrix, where the second sub-matrix $H_{y(j,q)}$ may include a 5×5 matrix.

At 325, the first wireless device 305-a may determine eigenvectors (e.g., precoders) for the LoS MIMO communications. The first wireless device 305-a may determine the eigenvectors/precoders based on the sub-matrices determined at 320. For example, in some cases, the first wireless device 305-a may determine a first set of eigenvectors (e.g., first set of precoders) associated with the first sub-matrix $H_{x(i,p)}$ and a second set of eigenvectors (e.g., second set of precoders) associated with the second sub-matrix $H_{y(j,q)}$.

The first wireless device 305-a may determine the eigenvectors of the sub-matrices (e.g., determine the precoders for the LoS MIMO communication) based on the symmetry associated with the sub-matrices. In particular, the first wireless device 305-a may determine the eigenvectors of the sub-matrices based on the sub-matrices including symmetric Toeplitz matrices. The symmetric Toeplitz properties of the sub-matrices may greatly simplify the computational complexity for solving the eigenvectors/precoders of the sub-matrices. In particular, if $H_x$ has N distinct eigenvectors (among the N eigenvectors), $$\left\lfloor \frac{N+1}{2} \right\rfloor$$

eigenvectors/precoders are symmetric with respect to the to the center of the sub-matrix and/or rectangular antenna array 215 (symmetric eigenvectors), where the other $\lfloor N/2 \rfloor$ eigenvectors/precoders are anti-symmetric with respect to the center (anti-symmetric eigenvectors). In effect, by decomposing the channel estimation matrix $H_{xy}$ between the rectangular antenna arrays into symmetric sub-matrices $H_x$, $H_y$, an N dimensional problem can be solved as an N/2 dimensional problem, effectively reducing the computational complexity (and processing resources) required to solve for the respective precoders for LoS MIMO communications.

At 330, the first wireless device 305-a may transmit, to the second wireless device 305-b, an indication of a set of precoders which are to be used for the LoS MIMO communication. In other words, the first wireless device 305-a may transmit an indication of the eigenvectors/precoders which were determined at 325. Additionally, or alternatively, the first wireless device 305-a may transmit the indication of the eigenvectors/precoders at 330 based on receiving the request for the beamforming information at 310, generating the channel estimation matrix at 315, generating the sub-matrices at 320, or any combination thereof.

In some aspects, the symmetric properties of the sub-matrices ($H_x$, $H_y$) may simplify the reporting of the precoders by reducing a quantity of precoders which are reported back to the second wireless device 305-b. For example, in cases where the second rectangular array at the second wireless device 305-b includes N antenna elements, the first wireless device 305-b may determine of N/2 or $$N+1/2$$

precoders, and may transmit an indication of the N/2 or $$N+1/2$$

quantity of precoders. In this example, the first wireless device 305-a may additionally indicate which precoders are symmetric, and which are anti-symmetric. In effect, the symmetric Toeplitz properties of the sub-matrices may enable the first wireless device 305-a to solve the N dimensional problem as an N/2 dimensional problem, effectively reducing the quantity of precoders which must be determined and reported back to the second wireless device 305-*b* in half.

In some implementations, such as cases where a wireless communications system supports a codebook of precoding vectors, the first wireless device 305-*a* may transmit an indication of a pre-defined set of precoders which is selected from a set (e.g., codebook) of pre-defined precoders. For example, in some cases, the first wireless device 305-*a*, the second wireless device 305-*b*, or both, may be configured with a codebook of pre-defined sets of precoders. The codebook of pre-defined precoders may be pre-configured at the respective wireless devices 305, indicated to the wireless devices 305 via signaling from a base station 105 (e.g., RRC signaling, MAC-CE signaling), or both. In this example, upon solving for the eigenvectors/precoders of the sub-matrices at 325, the first wireless device 305-*a* may determine a corresponding set of pre-defined precoders from a codebook of pre-defined precoders, and may transmit an indication of the set of pre-defined precoders to the second wireless device 305-*b* at 330. In some aspects, codebook-based precoding may reduce control signaling overhead within the wireless communications system, and may reduce a quantity of data which must be reported back to the second wireless device 305-*b* for the LoS MIMO communication.

At 335, the first wireless device 305-*a* may receive the LoS MIMO communication from the second wireless device 305-*b*. The first wireless device 305-*a* may receive the LoS MIMO communication based on (e.g., in accordance with) the precoders/eigenvectors which were determined at 325 and reported to the first wireless device 305-*b* at 330. For example, the second wireless device 305-*b* may receive the indication of the precoders at 330, and may transmit the LoS MIMO communication using the rectangular antenna array and the indicated set of precoders.

Techniques of the present disclosure may simplify the determination of precoders which will be used for performance of LoS MIMO communications in the context of rectangular antenna arrays. In particular, techniques described herein may enable the first wireless device 305-*a* to decompose channel estimation matrices which are based on rectangular antenna arrays into smaller, symmetric sub-arrays, effectively reducing the degrees of freedom of the sub-matrices and allowing for less computationally-expensive solving. As such, techniques described herein may reduce a computational complexity of LoS MIMO communications, thereby reducing power consumption at the first wireless device 305-*a*, and improving battery life. Moreover, reducing the computational complexity of LoS MIMO communications may enable lower-complexity wireless devices 305 to perform such communications, which may lead to more widespread use of LoS MIMO communications.

Figure 4:
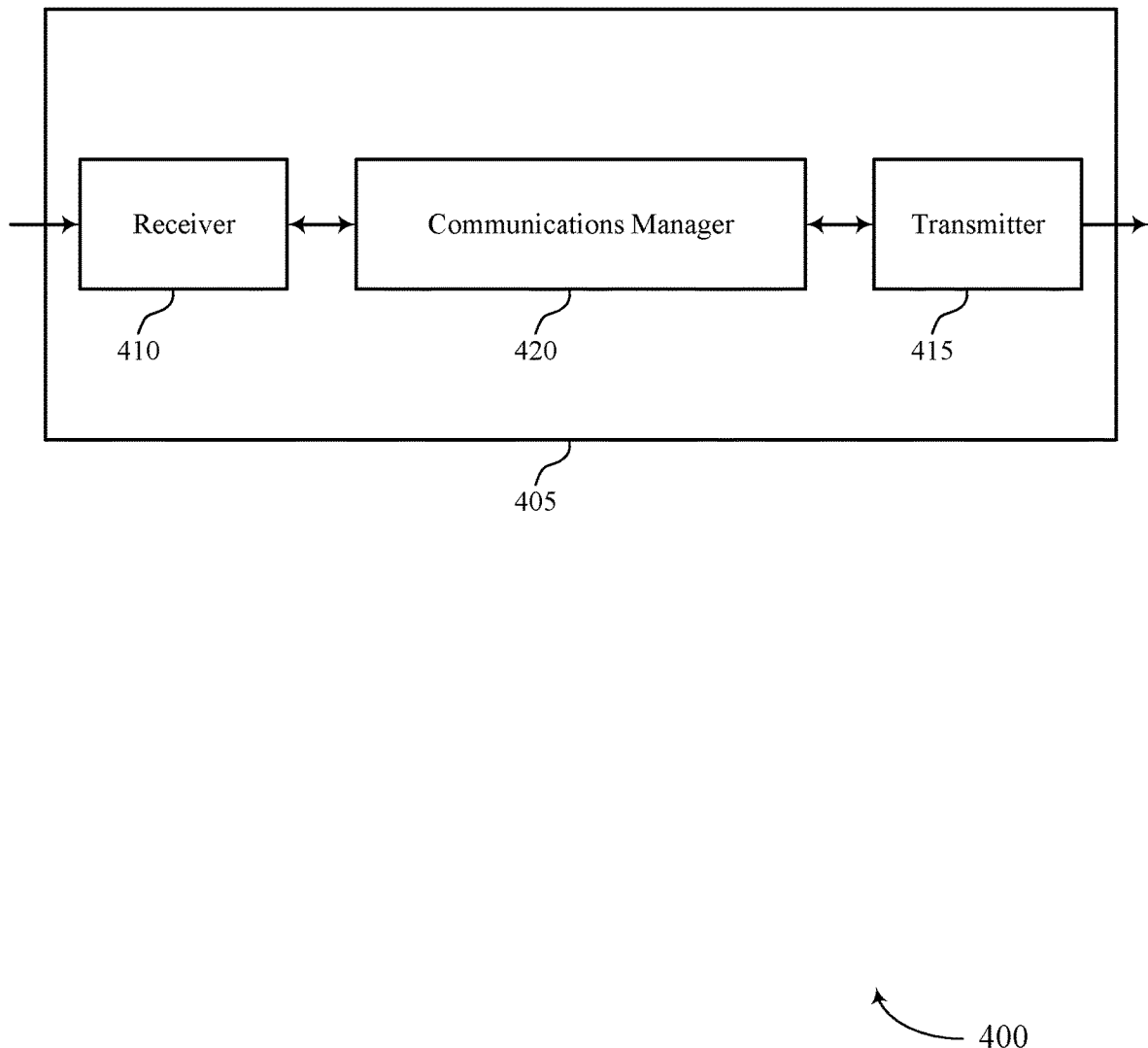
FIGS. 4 and 5 show block diagrams of devices that support techniques for LoS MIMO communications using rectangular antenna arrays in accordance with aspects of the present disclosure.

FIG. 4 shows a block diagram 400 of a device 405 that supports techniques for LoS MIMO communications using rectangular antenna arrays in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for LoS MIMO communications using rectangular antenna arrays). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for LoS MIMO communications using rectangular antenna arrays). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for LoS MIMO communications using rectangular antenna arrays as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first UE in accordance with examples as disclosed herein. For example, the communications manager 420 may be configured as or otherwise support a means for receiving, from a second UE, a request for beamforming information associated with LoS MIMO communication from the second UE to the first UE. The communications manager 420 may be configured as or otherwise support a means for generating a channel estimation matrix for a channel between a first rectangular antenna array of the first UE and a second rectangular antenna array of the second UE, the channel estimation matrix including one or more quadratic terms for the LoS MIMO communication. The communications manager 420 may be configured as or otherwise support a means for generating a first sub-matrix and a second sub-matrix based on the channel estimation matrix. The communications manager 420 may be configured as or otherwise support a means for transmitting, to the second UE, an indication of a set of multiple precoders for the LoS MIMO communication, the set of multiple precoders based on a symmetry associated with the first and second sub-matrices. The communications manager 420 may be configured as or otherwise support a means for receiving the LoS MIMO communication from the second UE based on the set of multiple precoders.

By including or configuring the communications manager 420 in accordance with examples as described herein, the device 405 (e.g., a processor controlling or otherwise coupled to the receiver 410, the transmitter 415, the communications manager 420, or a combination thereof) may support techniques which may simplify the determination of precoders which will be used for performance of LoS MIMO communications in the context of rectangular arrays. In particular, techniques described herein may enable UEs 115 to decompose channel estimation matrices which are based on rectangular antenna arrays into smaller, symmetric sub-arrays, effectively reducing the degrees of freedom of the sub-matrices and allowing for less computationally-expensive solving. As such, techniques described herein may reduce a computational complexity of LoS MIMO communications, thereby reducing power consumption at the UEs 115, and improving battery life. Moreover, reducing the computational complexity of LoS MIMO communications may enable lower-complexity UEs to perform such communications, which may lead to more widespread use of LoS MIMO communications.

Figure 5:
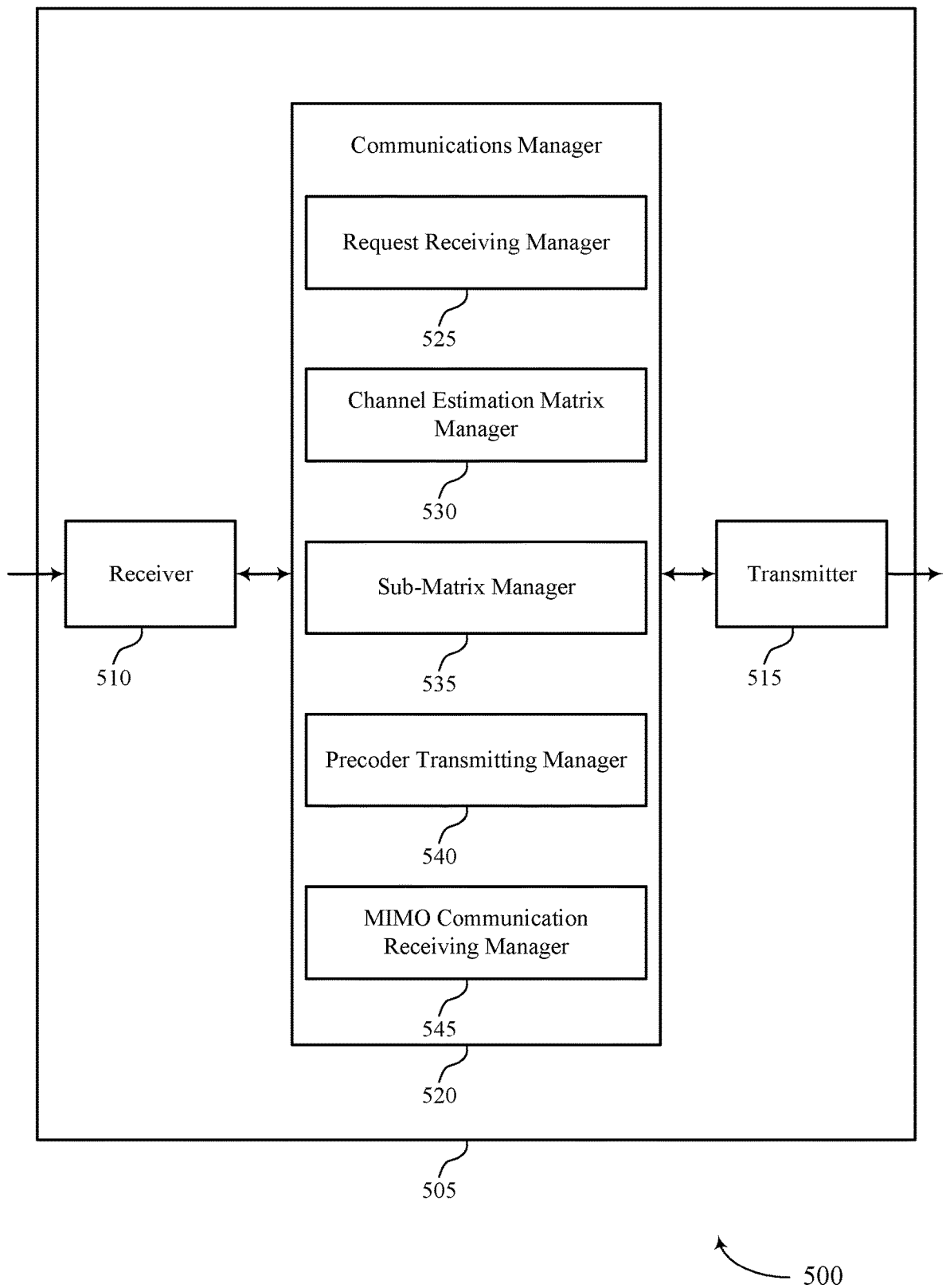

FIG. 5 shows a block diagram 500 of a device 505 that supports techniques for LoS MIMO communications using rectangular antenna arrays in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for LoS MIMO communications using rectangular antenna arrays). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for LoS MIMO communications using rectangular antenna arrays). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for LoS MIMO communications using rectangular antenna arrays as described herein. For example, the communications manager 520 may include a request receiving manager 525, a channel estimation matrix manager 530, a sub-matrix manager 535, a precoder transmitting manager 540, a MIMO communication receiving manager 545, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. The request receiving manager 525 may be configured as or otherwise support a means for receiving, from a second UE, a request for beamforming information associated with LoS MIMO communication from the second UE to the first UE. The channel estimation matrix manager 530 may be configured as or otherwise support a means for generating a channel estimation matrix for a channel between a first rectangular antenna array of the first UE and a second rectangular antenna array of the second UE, the channel estimation matrix including one or more quadratic terms for the LoS MIMO communication. The sub-matrix manager 535 may be configured as or otherwise support a means for generating a first sub-matrix and a second sub-matrix based on the channel estimation matrix. The precoder transmitting manager 540 may be configured as or otherwise support a means for transmitting, to the second UE, an indication of a set of multiple precoders for the LoS MIMO communication, the set of multiple precoders based on a symmetry associated with the first and second sub-matrices. The MIMO communication receiving manager 545 may be configured as or otherwise support a means for receiving the LoS MIMO communication from the second UE based on the set of multiple precoders.

Figure 6:
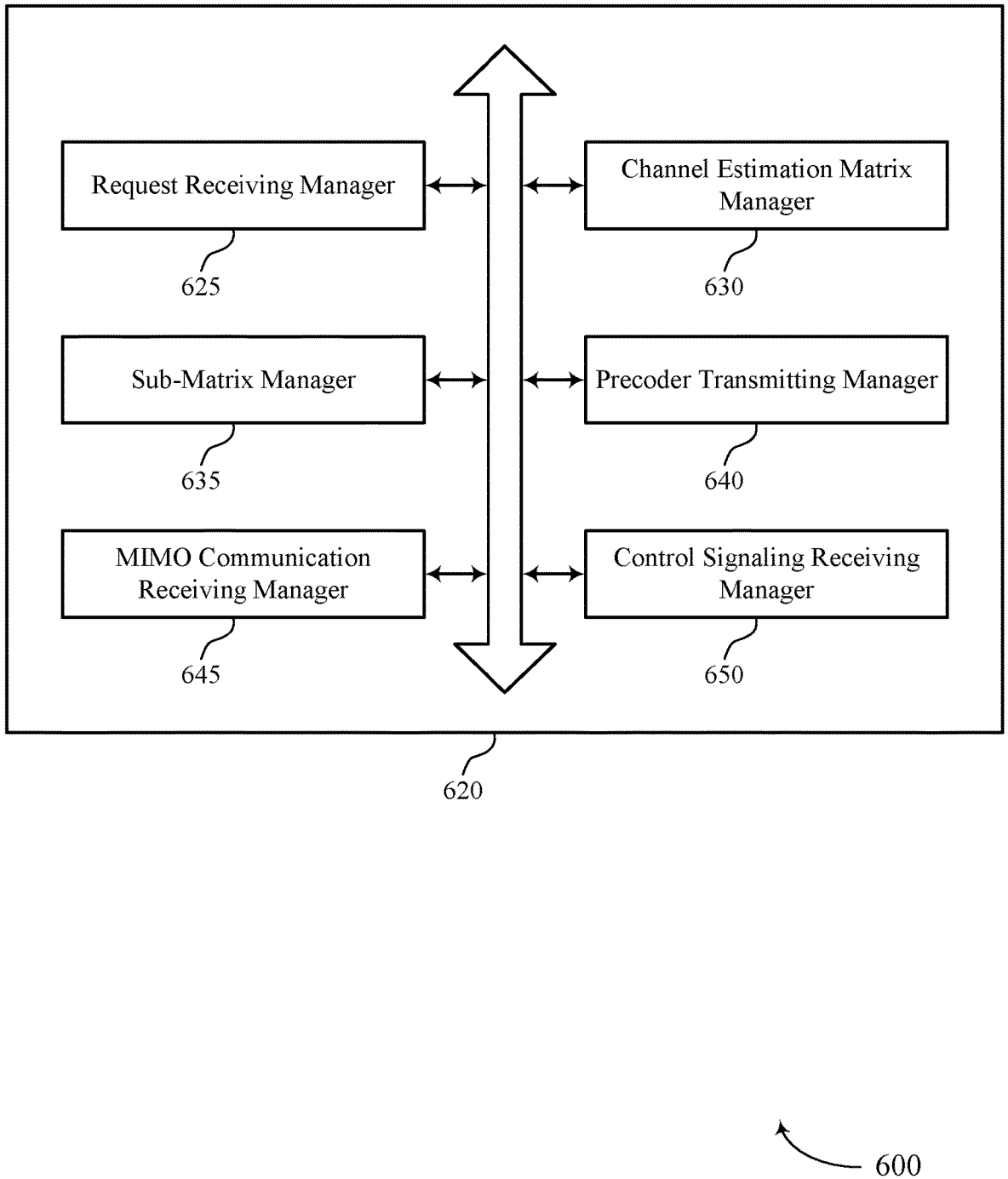
FIG. 6 shows a block diagram of a communications manager that supports techniques for LoS MIMO communications using rectangular antenna arrays in accordance with aspects of the present disclosure.

FIG. 6 shows a block diagram 600 of a communications manager 620 that supports techniques for LoS MIMO communications using rectangular antenna arrays in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for LoS MIMO communications using rectangular antenna arrays as described herein. For example, the communications manager 620 may include a request receiving manager 625, a channel estimation matrix manager 630, a sub-matrix manager 635, a precoder transmitting manager 640, a MIMO communication receiving manager 645, a control signaling receiving manager 650, or any combination thereof. Each of these components may communicate, directly or indirectly, with one another (e.g., via one or more buses).

The communications manager 620 may support wireless communication at a first UE in accordance with examples as disclosed herein. The request receiving manager 625 may be configured as or otherwise support a means for receiving, from a second UE, a request for beamforming information associated with LoS MIMO communication from the second UE to the first UE. The channel estimation matrix manager 630 may be configured as or otherwise support a means for generating a channel estimation matrix for a channel between a first rectangular antenna array of the first UE and a second rectangular antenna array of the second UE, the channel estimation matrix including one or more quadratic terms for the LoS MIMO communication. The sub-matrix manager 635 may be configured as or otherwise support a means for generating a first sub-matrix and a second sub-matrix based on the channel estimation matrix. The precoder transmitting manager 640 may be configured as or otherwise support a means for transmitting, to the second UE, an indication of a set of multiple precoders for the LoS MIMO communication, the set of multiple precoders based on a symmetry associated with the first and second sub-matrices. The MIMO communication receiving manager 645 may be configured as or otherwise support a means for receiving the LoS MIMO communication from the second UE based on the set of multiple precoders.

In some examples, the sub-matrix manager 635 may be configured as or otherwise support a means for determining a first set of eigenvectors associated with the first sub-matrix and a second set of eigenvectors associated with the second sub-matrix based on the symmetry associated with the first and second sub-matrices, where the set of multiple precoders are determined based on the first and second sets of eigenvectors.

In some examples, to support determining the first and second sets of eigenvectors, the sub-matrix manager 635 may be configured as or otherwise support a means for determining the first and second sets of eigenvectors associated with the first and second sub-matrices, respectively, based on a first half of the first and second sets of eigenvectors including symmetric eigenvectors and a second half of the first and second sets of eigenvectors including anti-symmetric eigenvectors.

In some examples, the first set of eigenvectors are symmetric with respect to the first sub-matrix. In some examples, the second set of eigenvectors are symmetric with respect to the second sub-matrix. In some examples, the channel estimation matrix manager 630 may be configured as or otherwise support a means for generating the one or more quadradic terms of the channel estimation matrix based on performing a paraxial approximation of the channel estimation matrix.

In some examples, to support transmitting the indication of the set of multiple precoders, the precoder transmitting manager 640 may be configured as or otherwise support a means for transmitting an indication of N/2 or (N+1)/2 precoders and an indication of a first subset of precoders which are symmetric and a second set of precoders which are anti-symmetric. In some examples, to support transmitting an indication of the set of multiple precoders, the precoder transmitting manager 640 may be configured as or otherwise support a means for transmitting an indication of a pre-defined set of precoders selected from a set of multiple pre-defined sets of precoders.

In some examples, the control signaling receiving manager 650 may be configured as or otherwise support a means for receiving, from a base station, control signaling indicating the set of multiple pre-defined sets of precoders, where transmitting the indication of the pre-defined set of precoders is based on receiving the control signaling.

In some examples, where a first order of the first sub-matrix is based on a first quantity of antenna element rows associated with the first rectangular antenna array and a second quantity of antenna element rows associated with the second rectangular antenna array. In some examples, where a second order of the second sub-matrix is based on a first quantity of antenna element columns associated with the first rectangular antenna array and a second quantity of antenna element columns associated with the second rectangular antenna array.

In some examples, an order of the channel estimation matrix is based on quantities of antenna element rows and quantities of antenna element columns of the first and second rectangular antenna arrays. In some examples, the first sub-matrix includes a first symmetric Toeplitz matrix and. In some examples, the second sub-matrix includes a second symmetric Toeplitz matrix.

In some examples, to support generating the first and second sub-matrices, the sub-matrix manager 635 may be configured as or otherwise support a means for generating the first sub-matrix associated with a first dimension of the channel estimation matrix. In some examples, to support generating the first and second sub-matrices, the sub-matrix manager 635 may be configured as or otherwise support a means for generating the second sub-matrix associated with a second dimension of the channel estimation matrix, the second dimension orthogonal to the first dimension. In some examples, a cross-product of the first sub-matrix and the second sub-matrix includes the channel estimation matrix.

Figure 7:
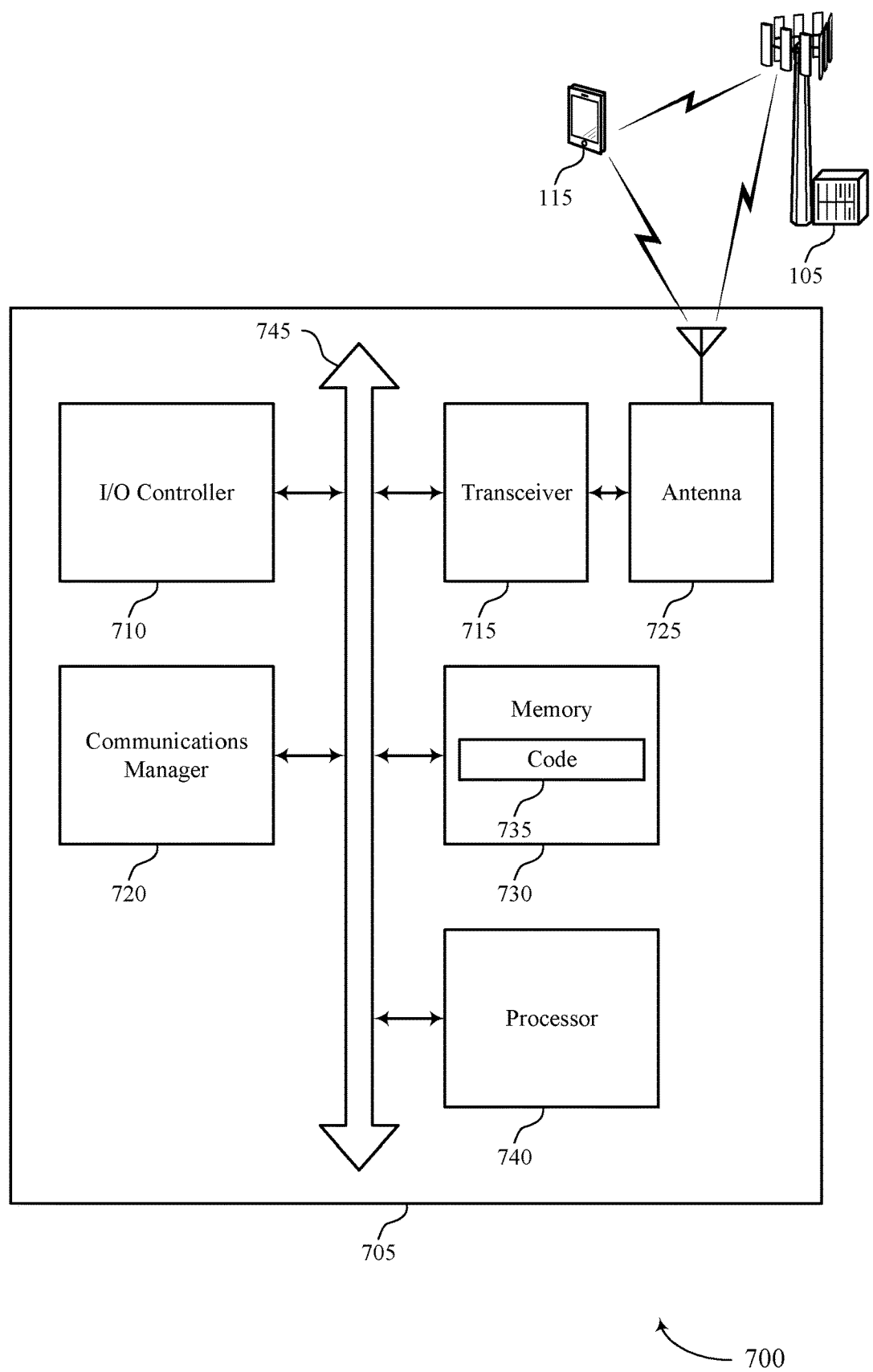
FIG. 7 shows a diagram of a system including a device that supports techniques for LoS MIMO communications using rectangular antenna arrays in accordance with aspects of the present disclosure.

FIG. 7 shows a diagram of a system 700 including a device 705 that supports techniques for LoS MIMO communications using rectangular antenna arrays in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for LoS MIMO communications using rectangular antenna arrays). For example, the device 705 or a component of the device 705 may include a processor 740 and memory 730 coupled to the processor 740, the processor 740 and memory 730 configured to perform various functions described herein.

The communications manager 720 may support wireless communication at a first UE in accordance with examples as disclosed herein. For example, the communications manager 720 may be configured as or otherwise support a means for receiving, from a second UE, a request for beamforming information associated with LoS MIMO communication from the second UE to the first UE. The communications manager 720 may be configured as or otherwise support a means for generating a channel estimation matrix for a channel between a first rectangular antenna array of the first UE and a second rectangular antenna array of the second UE, the channel estimation matrix including one or more quadratic terms for the LoS MIMO communication. The communications manager 720 may be configured as or otherwise support a means for generating a first sub-matrix and a second sub-matrix based on the channel estimation matrix. The communications manager 720 may be configured as or otherwise support a means for transmitting, to the second UE, an indication of a set of multiple precoders for the LoS MIMO communication, the set of multiple precoders based on a symmetry associated with the first and second sub-matrices. The communications manager 720 may be configured as or otherwise support a means for receiving the LoS MIMO communication from the second UE based on the set of multiple precoders.

By including or configuring the communications manager 720 in accordance with examples as described herein, the device 705 may support techniques which may simplify the determination of precoders which will be used for performance of LoS MIMO communications in the context of rectangular arrays. In particular, techniques described herein may enable UEs 115 to decompose channel estimation matrices which are based on rectangular antenna arrays into smaller, symmetric sub-arrays, effectively reducing the degrees of freedom of the sub-matrices and allowing for less computationally-expensive solving. As such, techniques described herein may reduce a computational complexity of LoS MIMO communications, thereby reducing power consumption at the UEs 115, and improving battery life. Moreover, reducing the computational complexity of LoS MIMO communications may enable lower-complexity UEs to perform such communications, which may lead to more widespread use of LoS MIMO In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for LoS MIMO communications using rectangular antenna arrays as described herein, or the processor 740 and the memory 730 may be otherwise configured to perform or support such operations.

Figure 8:
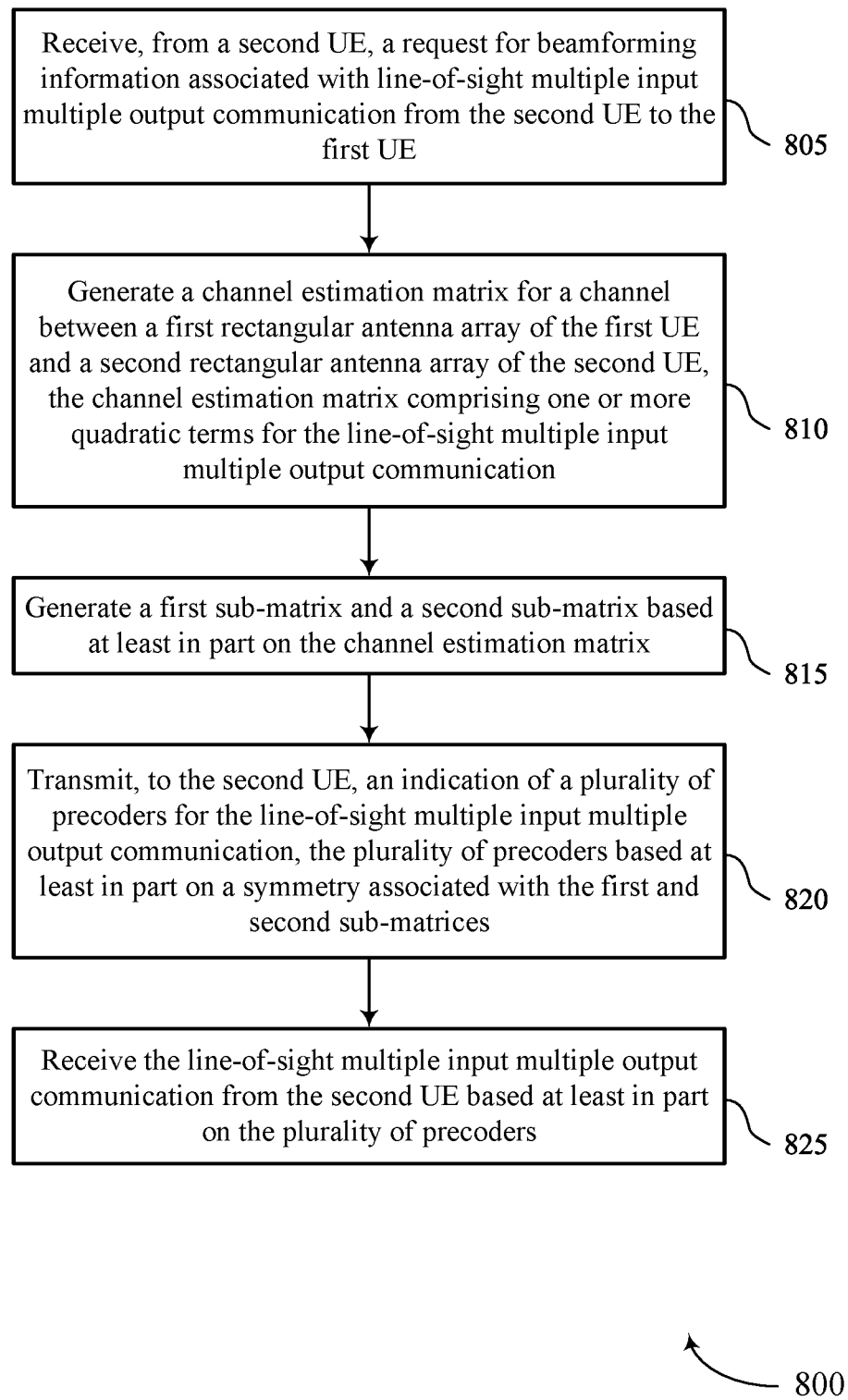
FIGS. 8 through 10 show flowcharts illustrating methods that support techniques for LoS MIMO communications using rectangular antenna arrays in accordance with aspects of the present disclosure.

FIG. 8 shows a flowchart illustrating a method 800 that supports techniques for LoS MIMO communications using rectangular antenna arrays in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include receiving, from a second UE, a request for beamforming information associated with LoS MIMO communication from the second UE to the first UE. The operations of 805 may be performed in accordance with examples as disclosed herein. In some examples, aspects of the operations of 805 may be performed by a request receiving manager 625 as described with reference to FIG. 6.

At 810, the method may include generating a channel estimation matrix for a channel between a first rectangular antenna array of the first UE and a second rectangular antenna array of the second UE, the channel estimation matrix including one or more quadratic terms for the LoS MIMO communication. The operations of 810 may be performed in accordance with examples as disclosed herein. In some examples, aspects of the operations of 810 may be performed by a channel estimation matrix manager 630 as described with reference to FIG. 6.

At 815, the method may include generating a first sub-matrix and a second sub-matrix based on the channel estimation matrix. The operations of 815 may be performed in accordance with examples as disclosed herein. In some examples, aspects of the operations of 815 may be performed by a sub-matrix manager 635 as described with reference to FIG. 6.

At 820, the method may include transmitting, to the second UE, an indication of a set of multiple precoders for the LoS MIMO communication, the set of multiple precoders based on a symmetry associated with the first and second sub-matrices. The operations of 820 may be performed in accordance with examples as disclosed herein. In some examples, aspects of the operations of 820 may be performed by a precoder transmitting manager 640 as described with reference to FIG. 6.

At 825, the method may include receiving the LoS MIMO communication from the second UE based on the set of multiple precoders. The operations of 825 may be performed in accordance with examples as disclosed herein. In some examples, aspects of the operations of 825 may be performed by a MIMO communication receiving manager 645 as described with reference to FIG. 6.

Figure 9:
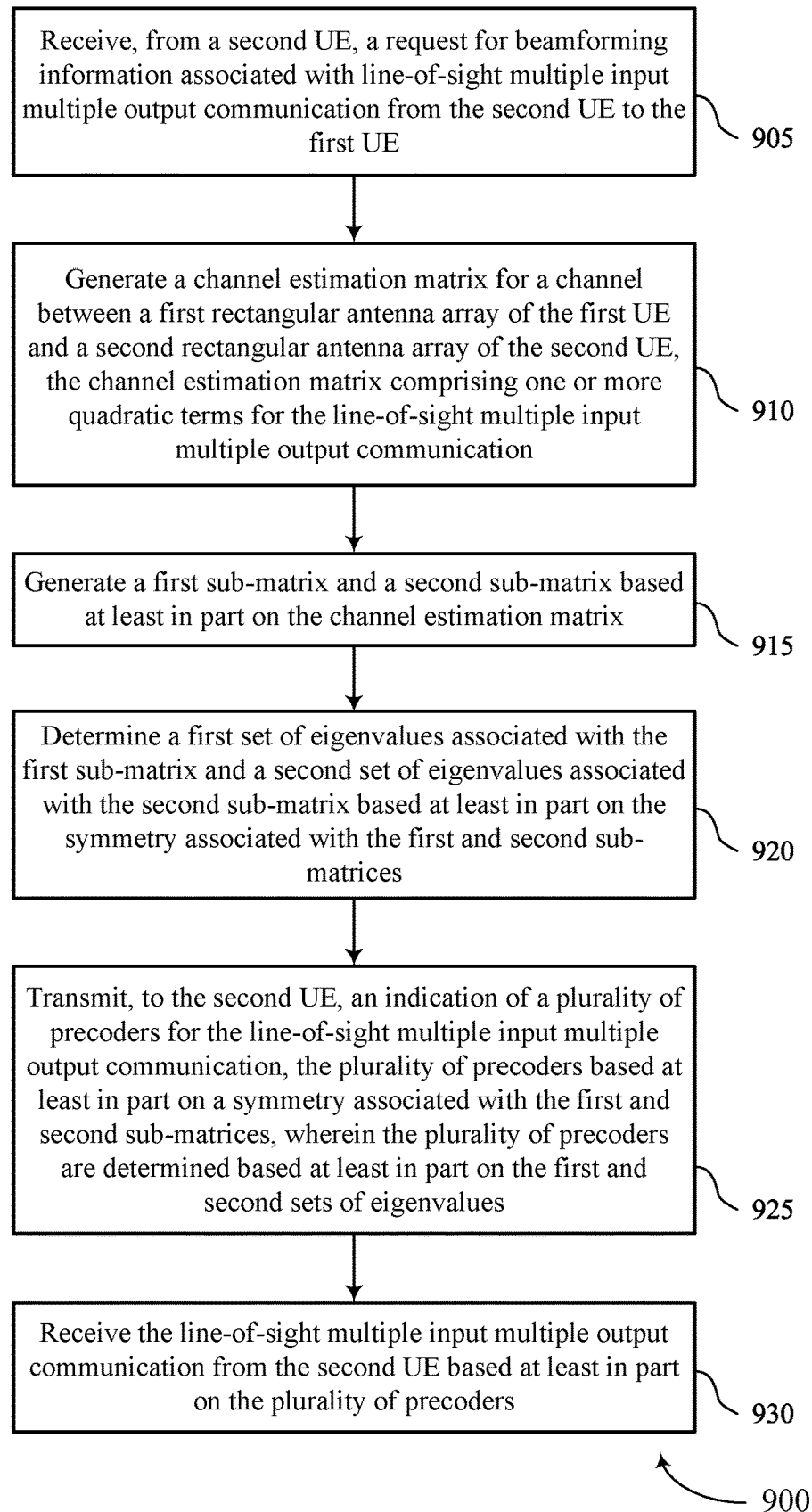

FIG. 9 shows a flowchart illustrating a method 900 that supports techniques for LoS MIMO communications using rectangular antenna arrays in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include receiving, from a second UE, a request for beamforming information associated with LoS MIMO communication from the second UE to the first UE. The operations of 905 may be performed in accordance with examples as disclosed herein. In some examples, aspects of the operations of 905 may be performed by a request receiving manager 625 as described with reference to FIG. 6.

At 910, the method may include generating a channel estimation matrix for a channel between a first rectangular antenna array of the first UE and a second rectangular antenna array of the second UE, the channel estimation matrix including one or more quadratic terms for the LoS MIMO communication. The operations of 910 may be performed in accordance with examples as disclosed herein. In some examples, aspects of the operations of 910 may be performed by a channel estimation matrix manager 630 as described with reference to FIG. 6.

At 915, the method may include generating a first sub-matrix and a second sub-matrix based on the channel estimation matrix. The operations of 915 may be performed in accordance with examples as disclosed herein. In some examples, aspects of the operations of 915 may be performed by a sub-matrix manager 635 as described with reference to FIG. 6.

At 920, the method may include determining a first set of eigenvectors associated with the first sub-matrix and a second set of eigenvectors associated with the second sub-matrix based on the symmetry associated with the first and second sub-matrices. The operations of 920 may be performed in accordance with examples as disclosed herein. In some examples, aspects of the operations of 920 may be performed by a sub-matrix manager 635 as described with reference to FIG. 6.

At 925, the method may include transmitting, to the second UE, an indication of a set of multiple precoders for the LoS MIMO communication, the set of multiple precoders based on a symmetry associated with the first and second sub-matrices, where the set of multiple precoders are determined based on the first and second sets of eigenvectors. The operations of 925 may be performed in accordance with examples as disclosed herein. In some examples, aspects of the operations of 925 may be performed by a precoder transmitting manager 640 as described with reference to FIG. 6.

At 930, the method may include receiving the LoS MIMO communication from the second UE based on the set of multiple precoders. The operations of 930 may be performed in accordance with examples as disclosed herein. In some examples, aspects of the operations of 930 may be performed by a MIMO communication receiving manager 645 as described with reference to FIG. 6.

Figure 10:
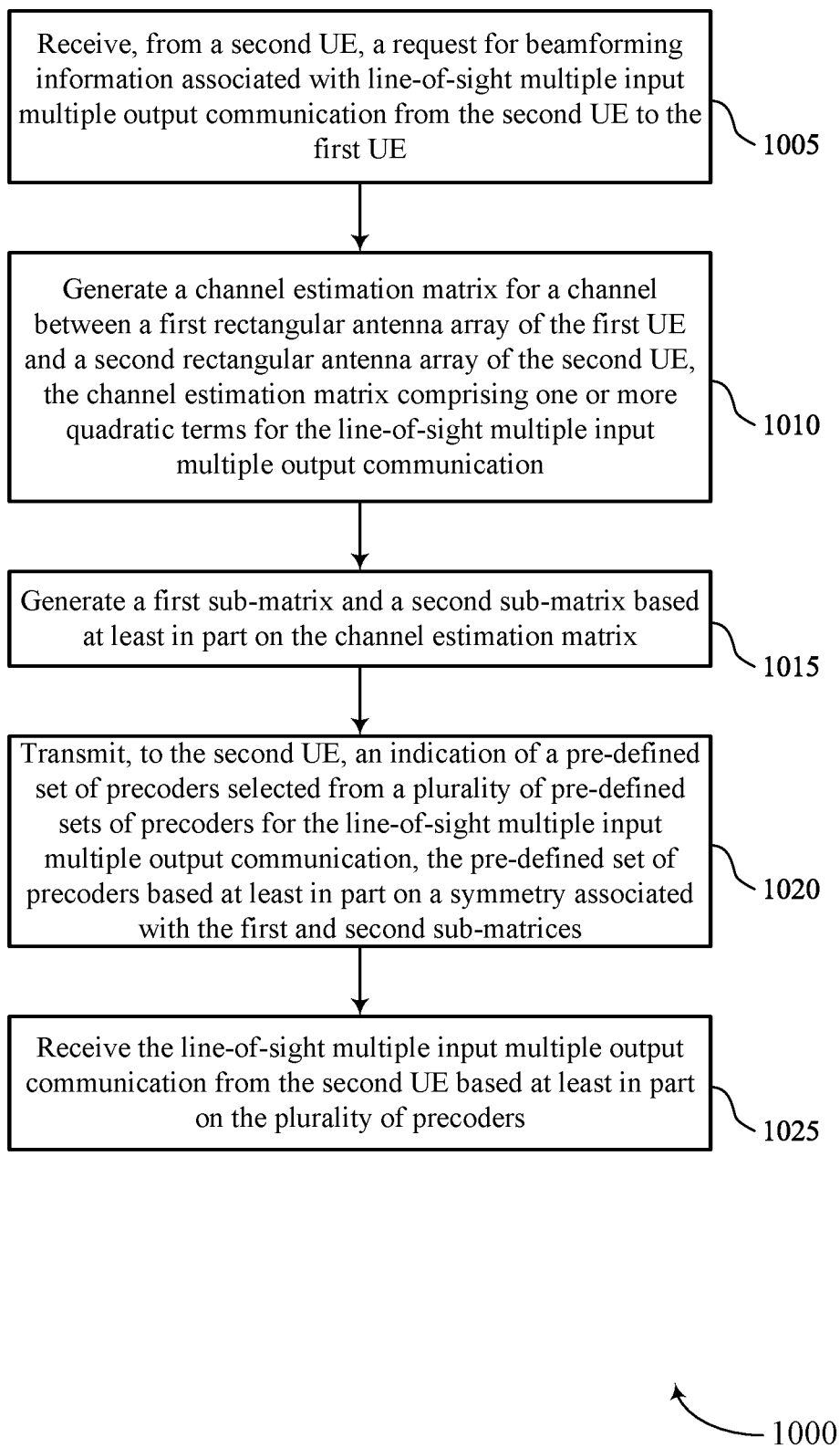

FIG. 10 shows a flowchart illustrating a method 1000 that supports techniques for LoS MIMO communications using rectangular antenna arrays in accordance with aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1005, the method may include receiving, from a second UE, a request for beamforming information associated with LoS MIMO communication from the second UE to the first UE. The operations of 1005 may be performed in accordance with examples as disclosed herein. In some examples, aspects of the operations of 1005 may be performed by a request receiving manager 625 as described with reference to FIG. 6.

At 1010, the method may include generating a channel estimation matrix for a channel between a first rectangular antenna array of the first UE and a second rectangular antenna array of the second UE, the channel estimation matrix including one or more quadratic terms for the LoS MIMO communication. The operations of 1010 may be performed in accordance with examples as disclosed herein. In some examples, aspects of the operations of 1010 may be performed by a channel estimation matrix manager 630 as described with reference to FIG. 6.

At 1015, the method may include generating a first sub-matrix and a second sub-matrix based on the channel estimation matrix. The operations of 1015 may be performed in accordance with examples as disclosed herein. In some examples, aspects of the operations of 1015 may be performed by a sub-matrix manager 635 as described with reference to FIG. 6.

At 1020, the method may include transmitting, to the second UE, an indication of a pre-defined set of precoders selected from a set of multiple pre-defined sets of precoders for the LoS MIMO communication, the set of multiple precoders based on a symmetry associated with the first and second sub-matrices. The operations of 1020 may be performed in accordance with examples as disclosed herein. In some examples, aspects of the operations of 1020 may be performed by a precoder transmitting manager 640 as described with reference to FIG. 6.

At 1025, the method may include receiving the LoS MIMO communication from the second UE based on the set of multiple precoders. The operations of 1025 may be performed in accordance with examples as disclosed herein. In some examples, aspects of the operations of 1025 may be performed by a MIMO communication receiving manager 645 as described with reference to FIG. 6.

The following provides an overview of aspects of the present disclosure:

Aspect 1: A method for wireless communication at a first wireless device, comprising: receiving, from a second wireless device, a request for beamforming information associated with LoS MIMO communication from the second wireless device to the first wireless device; generating a channel estimation matrix for a channel between a first rectangular antenna array of the first wireless device and a second rectangular antenna array of the second wireless device, the channel estimation matrix comprising one or more quadratic terms for the LoS MIMO communication; generating a first sub-matrix and a second sub-matrix based at least in part on the channel estimation matrix; transmitting, to the second wireless device, an indication of a plurality of precoders for the LoS MIMO communication, the plurality of precoders based at least in part on a symmetry associated with the first and second sub-matrices; and receiving the LoS MIMO communication from the second wireless device based at least in part on the plurality of precoders.

Aspect 2: The method of aspect 1, further comprising: determining a first set of eigenvectors associated with the first sub-matrix and a second set of eigenvectors associated with the second sub-matrix based at least in part on the symmetry associated with the first and second sub-matrices, wherein the plurality of precoders are determined based at least in part on the first and second sets of eigenvectors.

Aspect 3: The method of aspect 2, wherein determining the first and second sets of eigenvectors comprises: determining the first and second sets of eigenvectors associated with the first and second sub-matrices, respectively, based at least in part on a first half of the first and second sets of eigenvectors comprising symmetric eigenvectors and a second half of the first and second sets of eigenvectors comprising anti-symmetric eigenvectors.

Aspect 4: The method of any of aspects 2 through 3, wherein the first set of eigenvectors are symmetric with respect to the first sub-matrix, and the second set of eigenvectors are symmetric with respect to the second sub-matrix.

Aspect 5: The method of any of aspects 1 through 4, further comprising: generating the one or more quadratic terms of the channel estimation matrix based at least in part on performing a paraxial approximation of the channel estimation matrix.

Aspect 6: The method of any of aspects 1 through 5, wherein the second rectangular antenna array of the second wireless device comprises N antenna elements, and wherein transmitting the indication of the plurality of precoders comprises: transmitting an indication of N/2 or $N+1/2$ precoders and an indication of a first subset of precoders which are symmetric and a second set of precoders which are anti-symmetric.

Aspect 7: The method of any of aspects 1 through 6, wherein transmitting an indication of the plurality of precoders comprises: transmitting an indication of a pre-defined set of precoders selected from a plurality of pre-defined sets of precoders.

Aspect 8: The method of aspect 7, further comprising: receiving, from a third wireless device, control signaling indicating the plurality of pre-defined sets of precoders, wherein transmitting the indication of the pre-defined set of precoders is based at least in part on receiving the control signaling.

Aspect 9: The method of any of aspects 1 through 8, wherein a first order of the first sub-matrix is based at least in part on a first quantity of antenna element rows associated with the first rectangular antenna array and a second quantity of antenna element rows associated with the second rectangular antenna array, and wherein a second order of the second sub-matrix is based at least in part on a first quantity of antenna element columns associated with the first rectangular antenna array and a second quantity of antenna element columns associated with the second rectangular antenna array.

Aspect 10: The method of any of aspects 1 through 9, wherein an order of the channel estimation matrix is based at least in part on quantities of antenna element rows and quantities of antenna element columns of the first and second rectangular antenna arrays.

Aspect 11: The method of any of aspects 1 through 10, wherein the first sub-matrix comprises a first symmetric Toeplitz matrix and the second sub-matrix comprises a second symmetric Toeplitz matrix.

Aspect 12: The method of any of aspects 1 through 11, wherein generating the first and second sub-matrices comprises: generating the first sub-matrix associated with a first dimension of the channel estimation matrix; and generating the second sub-matrix associated with a second dimension of the channel estimation matrix, the second dimension orthogonal to the first dimension.

Aspect 13: The method of any of aspects 1 through 12, wherein a cross-product of the first sub-matrix and the second sub-matrix comprises the channel estimation matrix.

Aspect 14: An apparatus for wireless communication at a first wireless device, comprising a processor; memory coupled with the processor; and instructions stored in the memory and executable by the processor to cause the apparatus to perform a method of any of aspects 1 through 13.

Aspect 15: An apparatus for wireless communication at a first wireless device, comprising at least one means for performing a method of any of aspects 1 through 13.

Aspect 16: A non-transitory computer-readable medium storing code for wireless communication at a first wireless device, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:

receiving, from a second wireless device, a request for beamforming information associated with line-of-sight multiple input multiple output communication from the second wireless device to the first wireless device;

generating a channel estimation matrix for a channel between a first rectangular antenna array of the first wireless device and a second rectangular antenna array of the second wireless device, the channel estimation matrix comprising one or more quadratic terms for the line-of-sight multiple input multiple output communication;

generating a first sub-matrix and a second sub-matrix based at least in part on the channel estimation matrix;

transmitting, to the second wireless device, an indication of a plurality of precoders for the line-of-sight multiple input multiple output communication, the plurality of precoders based at least in part on a symmetry associated with the first and second sub-matrices; and receiving the line-of-sight multiple input multiple output communication from the second wireless device based at least in part on the plurality of precoders.

2. The method of claim 1, further comprising:
determining a first set of eigenvectors associated with the first sub-matrix and a second set of eigenvectors associated with the second sub-matrix based at least in part on the symmetry associated with the first and second sub-matrices, wherein the plurality of precoders are determined based at least in part on the first and second sets of eigenvectors.

3. The method of claim 2, wherein determining the first and second sets of eigenvectors comprises:
determining the first and second sets of eigenvectors associated with the first and second sub-matrices, respectively, based at least in part on a first half of the first and second sets of eigenvectors comprising symmetric eigenvectors and a second half of the first and second sets of eigenvectors comprising anti-symmetric eigenvectors.

4. The method of claim 2, wherein the first set of eigenvectors are symmetric with respect to the first sub-matrix, and wherein the second set of eigenvectors are symmetric with respect to the second sub-matrix.

5. The method of claim 1, further comprising:
generating the one or more quadradic terms of the channel estimation matrix based at least in part on performing a paraxial approximation of the channel estimation matrix.

6. The method of claim 1, wherein the second rectangular antenna array of the second wireless device comprises N antenna elements, and wherein transmitting the indication of the plurality of precoders comprises:
transmitting an indication of N/2 or $$N+1/2$$

precoders and an indication of a first subset of precoders which are symmetric and a second set of precoders which are anti-symmetric.

7. The method of claim 1, wherein transmitting an indication of the plurality of precoders comprises:
transmitting an indication of a pre-defined set of precoders selected from a plurality of pre-defined sets of precoders.

8. The method of claim 7, further comprising:
receiving, from a third wireless device, control signaling indicating the plurality of pre-defined sets of precoders, wherein transmitting the indication of the pre-defined set of precoders is based at least in part on receiving the control signaling.

9. The method of claim 1,
wherein a first order of the first sub-matrix is based at least in part on a first quantity of antenna element rows associated with the first rectangular antenna array and a second quantity of antenna element rows associated with the second rectangular antenna array, and
wherein a second order of the second sub-matrix is based at least in part on a first quantity of antenna element columns associated with the first rectangular antenna array and a second quantity of antenna element columns associated with the second rectangular antenna array.

10. The method of claim 1, wherein an order of the channel estimation matrix is based at least in part on quantities of antenna element rows and quantities of antenna element columns of the first and second rectangular antenna arrays.

11. The method of claim 1, wherein the first sub-matrix comprises a first symmetric Toeplitz matrix and wherein the second sub-matrix comprises a second symmetric Toeplitz matrix.

12. The method of claim 1, wherein generating the first and second sub-matrices comprises:
generating the first sub-matrix associated with a first dimension of the channel estimation matrix; and
generating the second sub-matrix associated with a second dimension of the channel estimation matrix, the second dimension orthogonal to the first dimension.

13. The method of claim 1, wherein a cross-product of the first sub-matrix and the second sub-matrix comprises the channel estimation matrix.

14. An apparatus for wireless communication at a first wireless device, comprising:
a processor;
memory in electronic communication with the processor; and
instructions stored in the memory, wherein the instructions are executable by the processor to:
receive, from a second wireless device, a request for beamforming information associated with line-of-sight multiple input multiple output communication from the second wireless device to the first wireless device;
generate a channel estimation matrix for a channel between a first rectangular antenna array of the first wireless device and a second rectangular antenna array of the second wireless device, the channel estimation matrix comprising one or more quadratic terms for the line-of-sight multiple input multiple output communication;
generate a first sub-matrix and a second sub-matrix based at least in part on the channel estimation matrix;
transmit, to the second wireless device, an indication of a plurality of precoders for the line-of-sight multiple input multiple output communication, the plurality of precoders based at least in part on a symmetry associated with the first and second sub-matrices; and
receive the line-of-sight multiple input multiple output communication from the second wireless device based at least in part on the plurality of precoders.

15. The apparatus of claim 14, wherein the instructions are further executable by the processor to cause the apparatus to:
  determine a first set of eigenvectors associated with the first sub-matrix and a second set of eigenvectors associated with the second sub-matrix based at least in part on the symmetry associated with the first and second sub-matrices, wherein the plurality of precoders are determined based at least in part on the first and second sets of eigenvectors.

16. The apparatus of claim 15, wherein the instructions to determine the first and second sets of eigenvectors are executable by the processor to cause the apparatus to:
  determine the first and second sets of eigenvectors associated with the first and second sub-matrices, respectively, based at least in part on a first half of the first and second sets of eigenvectors comprising symmetric eigenvectors and a second half of the first and second sets of eigenvectors comprising anti-symmetric eigenvectors.

17. The apparatus of claim 15, wherein the first set of eigenvectors are symmetric with respect to the first sub-matrix, and wherein the second set of eigenvectors are symmetric with respect to the second sub-matrix.

18. The apparatus of claim 14, wherein the instructions are further executable by the processor to cause the apparatus to:
  generate the one or more quadradic terms of the channel estimation matrix based at least in part on performing a paraxial approximation of the channel estimation matrix.

19. The apparatus of claim 14, wherein the second rectangular antenna array of the second wireless device comprises N antenna elements, and wherein the instructions to transmit the indication of the plurality of precoders are executable by the processor to cause the apparatus to:
  transmit an indication of N/2 or $$N + 1/2$$

precoders and an indication of a first subset of precoders which are symmetric and a second set of precoders which are anti-symmetric.

20. The apparatus of claim 14, wherein the instructions to transmit an indication of the plurality of precoders are executable by the processor to cause the apparatus to:
  transmit an indication of a pre-defined set of precoders selected from a plurality of pre-defined sets of precoders.

21. The apparatus of claim 20, wherein the instructions are further executable by the processor to cause the apparatus to:
  receive, from a third wireless device, control signaling indicating the plurality of pre-defined sets of precoders, wherein transmitting the indication of the pre-defined set of precoders is based at least in part on receiving the control signaling.

22. The apparatus of claim 14,
  wherein a first order of the first sub-matrix is based at least in part on a first quantity of antenna element rows associated with the first rectangular antenna array and a second quantity of antenna element rows associated with the second rectangular antenna array, and
  wherein a second order of the second sub-matrix is based at least in part on a first quantity of antenna element columns associated with the first rectangular antenna array and a second quantity of antenna element columns associated with the second rectangular antenna array.

23. The apparatus of claim 14, wherein an order of the channel estimation matrix is based at least in part on quantities of antenna element rows and quantities of antenna element columns of the first and second rectangular antenna arrays.

24. The apparatus of claim 14, wherein the first sub-matrix comprises a first symmetric Toeplitz matrix and wherein the second sub-matrix comprises a second symmetric Toeplitz matrix.

25. The apparatus of claim 14, wherein the instructions to generate the first and second sub-matrices are executable by the processor to cause the apparatus to:
  generate the first sub-matrix associated with a first dimension of the channel estimation matrix; and
  generate the second sub-matrix associated with a second dimension of the channel estimation matrix, the second dimension orthogonal to the first dimension.

26. The apparatus of claim 14, wherein a cross-product of the first sub-matrix and the second sub-matrix comprises the channel estimation matrix.

27. A non-transitory computer-readable medium storing code for wireless communication at a first wireless device, the code comprising instructions executable to:
  receive, from a second wireless device, a request for beamforming information associated with line-of-sight multiple input multiple output communication from the second wireless device to the first wireless device;
  generate a channel estimation matrix for a channel between a first rectangular antenna array of the first wireless device and a second rectangular antenna array of the second wireless device, the channel estimation matrix comprising one or more quadratic terms for the line-of-sight multiple input multiple output communication;
  generate a first sub-matrix and a second sub-matrix based at least in part on the channel estimation matrix;
  transmit, to the second wireless device, an indication of a plurality of precoders for the line-of-sight multiple input multiple output communication, the plurality of precoders based at least in part on a symmetry associated with the first and second sub-matrices; and
  receive the line-of-sight multiple input multiple output communication from the second wireless device based at least in part on the plurality of precoders.

28. The non-transitory computer-readable medium of claim 27, wherein the instructions are further executable by the processor to:
  determine a first set of eigenvectors associated with the first sub-matrix and a second set of eigenvectors associated with the second sub-matrix based at least in part on the symmetry associated with the first and second sub-matrices, wherein the plurality of precoders are determined based at least in part on the first and second sets of eigenvectors.

29. The non-transitory computer-readable medium of claim 28, wherein the instructions to determine the first and second sets of eigenvectors are executable by the processor to:
  determine the first and second sets of eigenvectors associated with the first and second sub-matrices, respectively, based at least in part on a first half of the first and second sets of eigenvectors comprising symmetric eigenvectors and a second half of the first and second sets of eigenvectors comprising anti-symmetric eigenvectors.

30. The non-transitory computer-readable medium of claim 28, wherein the first set of eigenvectors are symmetric with respect to the first sub-matrix, and wherein the second set of eigenvectors are symmetric with respect to the second sub-matrix.

* * * * *